United States Patent [19]
Bernard

[11] Patent Number: 5,497,339
[45] Date of Patent: Mar. 5, 1996

[54] PORTABLE APPARATUS FOR PROVIDING MULTIPLE INTEGRATED COMMUNICATION MEDIA

[75] Inventor: Marc A. Bernard, San Diego, Calif.

[73] Assignee: ETE, Inc., San Diego, Calif.

[21] Appl. No.: 284,396

[22] Filed: Aug. 2, 1994

Related U.S. Application Data

[63] Continuation-in-part of Ser. No. 152,492, Nov. 15, 1993, abandoned.

[51] Int. Cl.⁶ .............................. G06F 3/00; G06F 13/00
[52] U.S. Cl. ..................................... 364/705.05; 395/500
[58] Field of Search .......................... 364/705.05, 708.1, 364/705.05, 708.1; 395/500

[56] References Cited

U.S. PATENT DOCUMENTS

| | | | |
|---|---|---|---|
| 4,788,658 | 11/1988 | Hanebuth | 364/708.1 |
| 4,893,263 | 1/1990 | Myers | 364/708.1 |
| 4,931,978 | 6/1990 | Drake et al. | 364/708.1 |
| 5,030,128 | 7/1991 | Herron et al. | 364/708.1 |
| 5,075,693 | 12/1991 | McMillan et al. | 364/449 |
| 5,119,504 | 6/1992 | Durboraw, III | 455/54.1 |
| 5,189,632 | 2/1993 | Paajanen et al. | 364/705.05 |
| 5,209,583 | 5/1993 | Lewis et al. | 400/88 |
| 5,212,628 | 5/1993 | Bradbury | 361/395 |
| 5,265,238 | 11/1993 | Canova, Jr. et al. | 395/500 |
| 5,283,714 | 2/1994 | Tsai et al. | 361/683 |
| 5,307,491 | 4/1994 | Feriozi et al. | 395/500 |

OTHER PUBLICATIONS

MobileComm Advertisement, *American Way* magazine, Nov. 1993.
Rockwell's NavCore V and MicroTracker Receivers product information, Jul. 1993.

*Primary Examiner*—David H. Malzahn
*Attorney, Agent, or Firm*—Knobbe, Martens, Olson & Bear

[57] ABSTRACT

The present invention relates to a communication device for a personal digital assistant (PDA). The PDA mounts within the communication device and the communication device connects electronically to a serial port on the PDA. Through this single serial port, the communication device provides the user of the PDA with access to multiple communication media, such as a telephone modem, a Global Positioning System engine, a packet radio and a cellular telephone. Data from the PDA is directed to a decoder that routes the data to the appropriate communication medium, while data from the communication media are multiplexed onto the single serial interface of the PDA. The communication device also provides a pass-thru serial interface that allows other external devices to communicate directly with the serial port of the PDA. In addition, the communication device can upload software to the PDA that facilitates communications between the PDA and the communication device, and allows the PDA to control the operation of the communication device.

13 Claims, 19 Drawing Sheets

PORTABLE APPARATUS FOR PROVIDING MULTIPLE INTEGRATED COMMUNICATION MEDIA

This is a Continuation-in-part of U.S. patent application Ser. No. 08/152,492, filed Nov. 15, 1993 now abandoned.

BACKGROUND OF THE INVENTION

1. Field of the Invention

The present invention is in the field of portable communication devices for providing a computer with multiple integrated communication media, such as a phone modem, a cellular telephone, a packet radio and a Global Positioning System engine. In particular, the present invention relates to a portable multiple integrated communication device for a palm computer.

2. Background Information

Recent advances in the manufacture of integrated circuit components have allowed ever increasing functional capabilities to be performed by fewer integrated circuit components. This increased density of processing power in modern electronic equipment allows for the design of small, portable instruments with impressive processing capabilities. Advances in other technological areas, such as LCD displays, pen-based input devices and handwritten character recognition, have also contributed to a new generation of truly portable computers that are aptly described as palm computers or personal digital assistants (PDAs), but which have sufficient processing capabilities for numerous tasks. Examples of such PDAs include the Apple™ Newton™ and the Sharp™ Expert Pad™. These computers allow a user to take notes, store data, retrieve data, run certain application programs and interface with external devices, such as printers, modems or an Appletalk™ network.

Summary of the Invention

The present invention connects to and interfaces with a PDA to dramatically increase the functional capabilities of the PDA. The present invention adds multiple integrated communication media to the resources currently available to the PDA, while maintaining a compact, portable size. For example, the combination of the present invention with a PDA can be used to place or receive a cellular telephone call or a land line telephone call, to transmit or receive packet radio data, to obtain three-dimensional location data from the Global Positioning System (GPS) and to send or receive data over a telephone cellular link or over a land line using a built in phone modem. These added communication features greatly enhance the utility of the PDAs. Instead of having a stand-alone PDA, isolated from other data sources, such as a person's office computer network, the combined PDA and multiple integrated communication device provides a powerful processing device with convenient access to vast stores of information over a variety of possible media.

One aspect of the present invention involves a portable communication device. The communication device comprises first and second communication circuits providing first and second differing modes of communication, a first generic emulator coupled to the first communication circuit and a second generic emulator coupled to the second communication circuit, a first interface unit coupled to the first generic emulator and a second interface unit coupled to the second generic emulator, and an application program. The application program accesses the first interface unit to generate a first command to control the operation of the first communication circuit. The application program accesses the second interface unit to generate a second command to control the operation of the second communication circuit. The first interface unit communicates the first command to the first generic emulator. The second interface unit communicates the second command to the second generic emulator. The first generic emulator reformats the first command and communicates the first command to the first communication circuit. The second generic emulator reformats the second command and communicates the second command to the second communication circuit. The first communication circuit executes the first command and the second communication circuit executes the second command.

Additional aspects of the present invention will be apparent in the following detailed description of the invention.

DETAILED DESCRIPTION OF THE PREFERRED EMBODIMENTS

Figure 1:
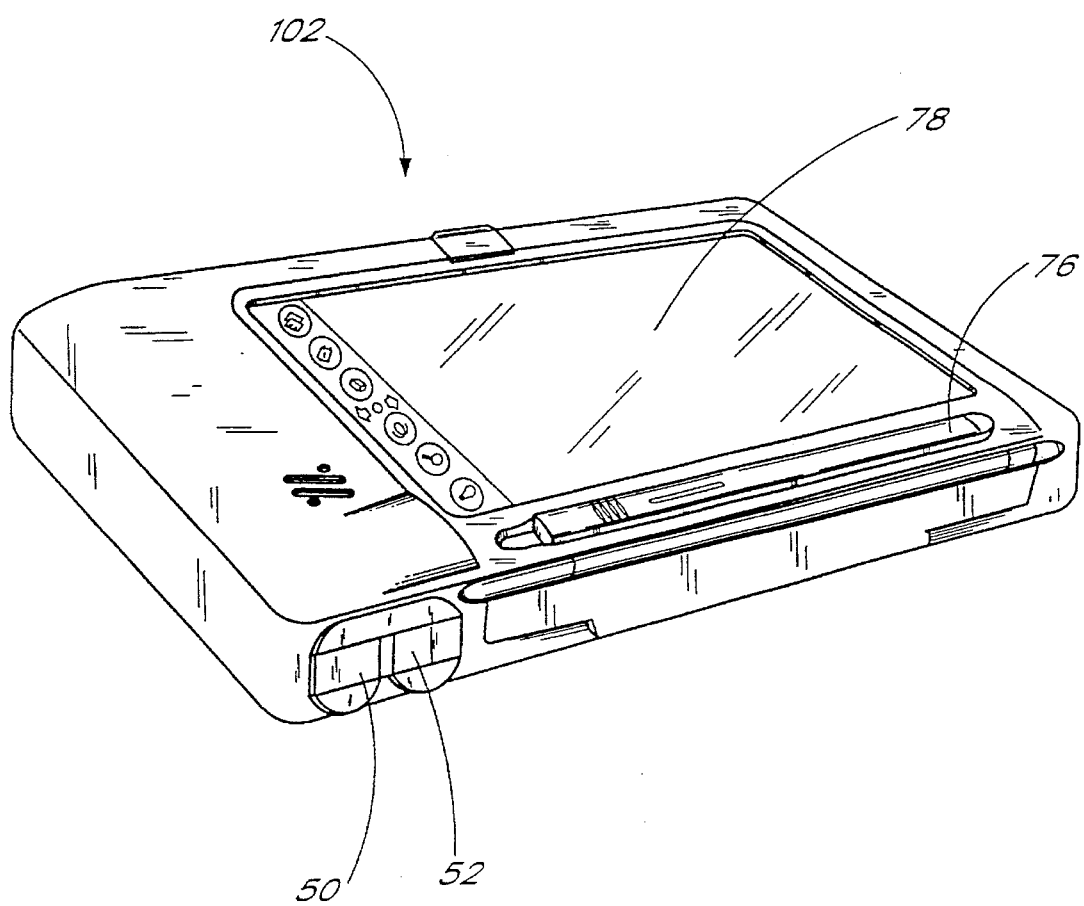
FIG. 1 is a perspective view of a palm computer for use with the portable multiple integrated communication device of the present invention.

FIG. 1 illustrates a palm computer or personal digital assistant (PDA) 102 for use with the present invention. The PDA 102 comprises an LCD display 78, a light pen 76, a DC power connector 50 and a serial interface connector 52. The PDA 102 provides an operator with a variety of data processing and data storage functions in a lightweight, portable device.

First Embodiment

Figure 2:
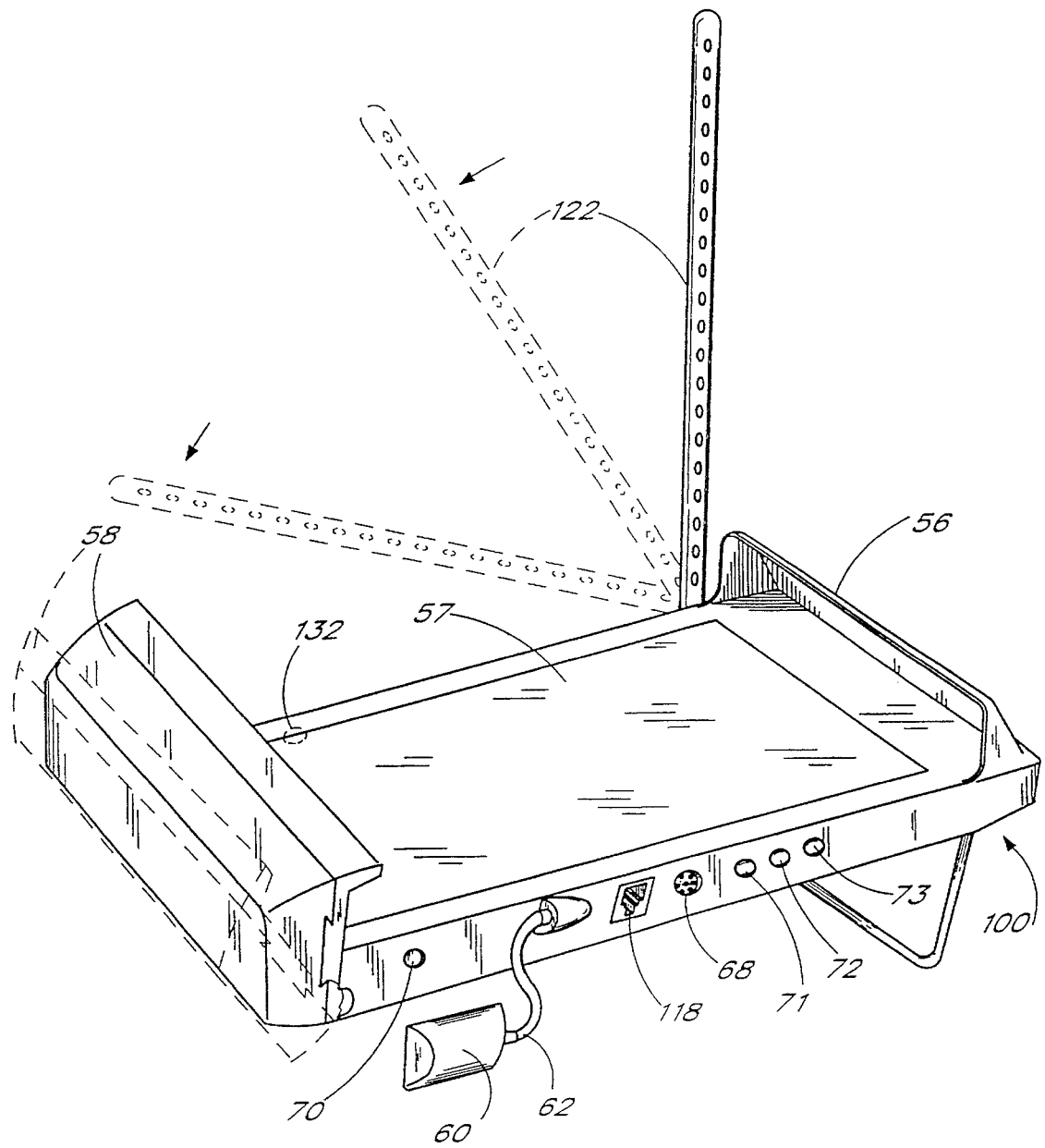
FIG. 2 is a perspective view of the communication device of the present invention.

FIGS. 2 to 9C illustrate a first embodiment 100 of the portable multiple integrated communication device of the present invention. FIG. 2 illustrates a perspective view of the communication device 100. Externally, the communication device 100 comprises a fixed securing surface 56, a supporting surface 57, a movable securing surface 58, a GPS antenna 123 (FIG. 7), either a cellular telephone antenna 121 (FIG. 8) or a packet radio antenna 122, a microphone and earphone jack 132, a serial/power interface connector 60, a serial/power interface cable 62, a phone jack 118, a pass-thru serial interface connector 68, a DC power connector 70 and a set of three LEDs 71, 72 and 73. The LEDs 71, 72 and 73 indicate a low battery, power-on and packet radio transmit condition.

Figure 3:
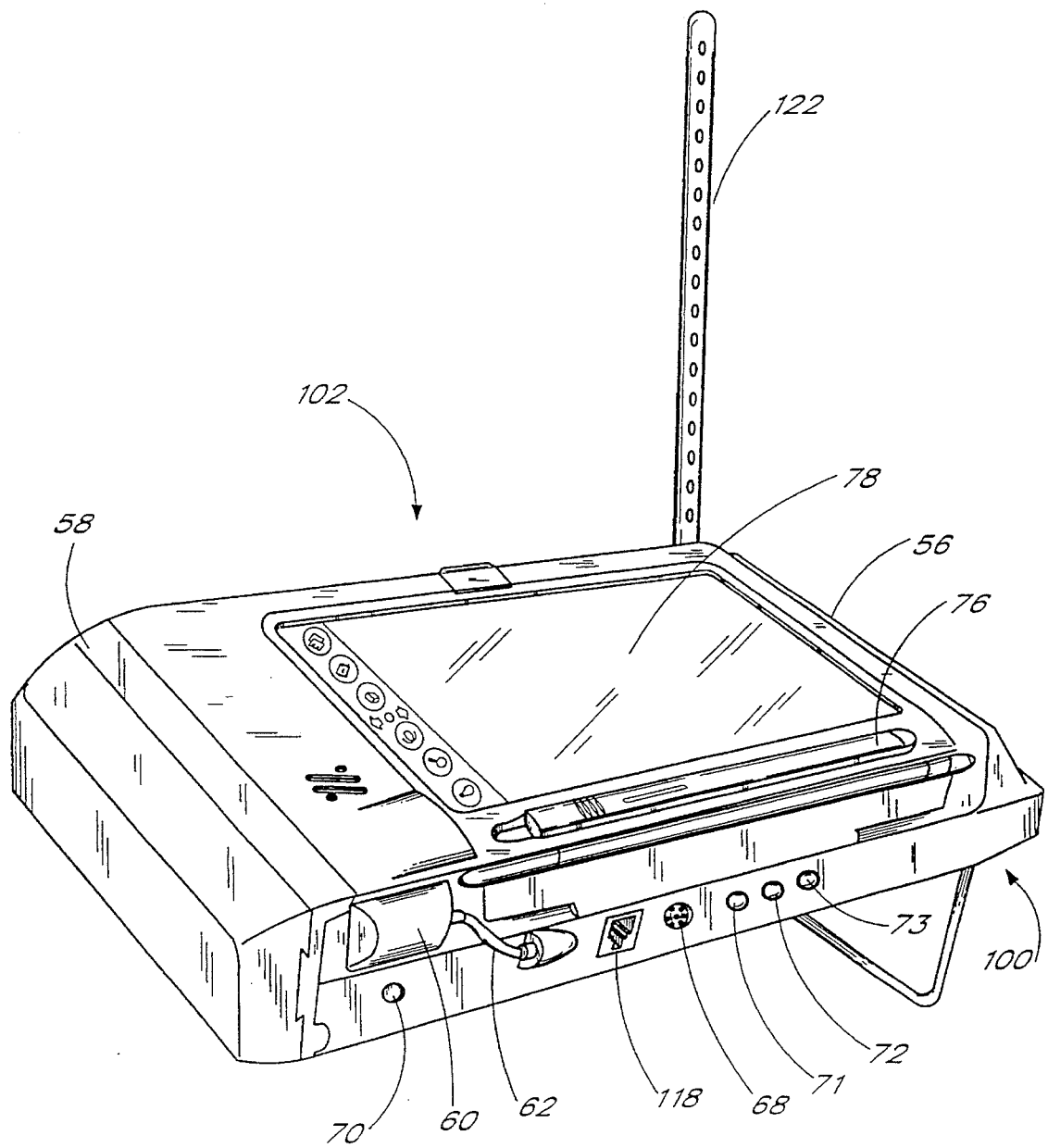
FIG. 3 is a perspective view of a palm computer mounted inside the communication device of the present invention.

FIG. 3 illustrates the PDA 102 of FIG. 1 inserted into the communication device 100 of FIG. 2. The PDA 102 is inserted into the communication device 100 by pressing the bottom end of the PDA 102 against the securing surface 58 to rotate the securing surface 58 toward its open position (shown by the phantom lines in FIG. 2) until the top end of the PDA 102 clears the fixed securing surface 56, lowering the PDA 102 against the supporting surface 57, with the orientation of FIG. 3. The PDA 102 is then released, and a spring (not shown) rotates the securing surface 58 to its closed position, as shown by the solid lines in FIGS. 2 and 3, pressing the top end of the PDA 102 against the securing surface 56. Next, the remote serial/power interface connector 60 of the communication device 100 is inserted into both the DC power connector 50 and the serial interface connector 52 of the PDA 102. The combination of the PDA 102 and the communication device 100 forms a small, lightweight unit that is convenient to carry around and to use.

The structure of the communication device 100 is preferably designed to allow access to connectors and controls of the PDA 102. For example, the securing surface 56 of the communication device 100 preferably has an opening corresponding to a slot in the top end of the Sharp™ Expert Pad™, for insertion of an IC card into the slot of the Expert Pad™. The packet radio antenna 122 and the cellular telephone antenna 121 (shown in FIG. 8) of the communication device 100 are preferably mounted so that they can be rotated between an active position and an inactive position. In the active position, the antenna 122 or 123 is generally perpendicular to the main structure of the communication device 100, as shown in FIG. 3, to achieve optimal reception. In the inactive position, the antenna 122 or 123 is adjacent to a side of the communication device 100 that is directly opposite the side with the phone jack 118. The GPS antenna 123 may be mounted on the frame of the communication device 100, or it may be a separate device.

Figure 4:
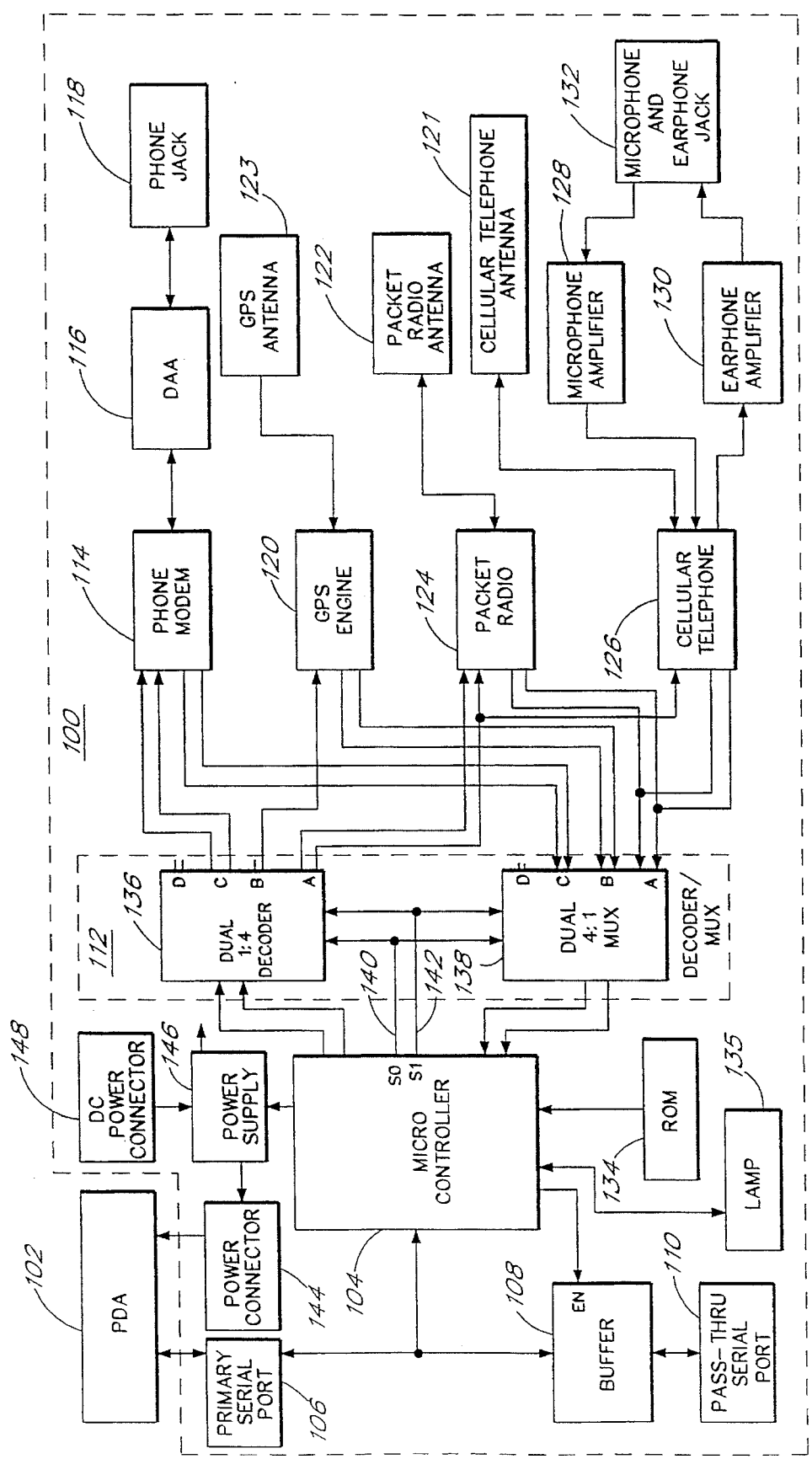
FIG. 4 is a general functional block diagram of a first embodiment of the communication device of the present invention, connected to a palm computer.

FIG. 4 illustrates a general functional block diagram of the first embodiment of the portable multiple integrated communication device 100 of the present invention, connected to a PDA 102. The communication device 100 comprises a primary serial port 106, a buffer 108, a pass-thru serial port 110, a DC power connector 148, a power supply 146, a power connector 144, a microcontroller 104, a read-only memory (ROM) 134, a lamp 135, a decoder/multiplexer 112, a phone modem 114, a Data Access Arrangement (DAA) 116, the phone jack 118, a Global Positioning System (GPS) engine 120, the GPS antenna 123, either a packet radio 124 or a cellular telephone 126, a microphone amplifier 128, an earphone amplifier 130, the microphone and earphone jack 132, and either the packet radio antenna 122 or the cellular telephone antenna 121. The decoder/multiplexer 112 comprises a dual 1:4 decoder or demultiplexer 136 and a dual 4:1 multiplexer or selector 138. In the first embodiment of the present invention, the communication device 100 comprises either the packet radio 124 or the cellular telephone 126, but not both. In one embodiment, the circuit card implementing the packet radio 124 occupies the same physical space inside the communication device 100 as the circuit card implementing the cellular telephone 126, thus conserving space and reducing the size of the communication device 100.

The microcontroller 104 preferably comprises an Intel® 80C320 microcontroller, although numerous other processors could be used. The microcontroller 104 communicates with the PDA 102 through the primary serial port 106. The serial/power interface cable 62 of FIGS. 2 and 3 is connected to the primary serial port 106 and the power connector 144 of FIG. 4. The primary serial port 160 is used for the communication of commands and data between the microcontroller 104 and the PDA 102, as well as for the downloading of program code from the ROM 134 to the PDA 102. The power connector 144 provides DC power from the power supply 146 to the PDA 102. The power supply 146 also provides DC power to circuitry in the communication device 100. The power supply 146 preferably comprises batteries. However, DC power can also be provided by an external source through the DC power connector 148 to the power supply 146. The microcontroller 104 can cause the power supply 146 to power down, either as a result of a command from the PDA 102 or after a period of inactivity, to conserve battery power.

The communication device 100 also has the separate pass-thru serial port 110 to allow other external devices to communicate with the PDA 102. Such devices may include printers, phone modems or an Appletalk™ network. The pass-thru serial port 110 is connected to the pass-thru serial interface connector 68 of FIGS. 2 and 3. The buffer 108 is used to enable or disable the serial port 110. In the first embodiment, the buffer 108 comprises an LTC1032 component. If the microcontroller 104 needs to transmit data to the PDA 102 or receive data from the PDA 102, the microcontroller 102 disables the buffer 108. Otherwise, the buffer 108 is enabled to allow an external device to communicate with the PDA 102 through the serial port 110 and the primary serial port 106. The serial interfaces between the microcontroller 104, the PDA 102 and external devices are described in greater detail below with reference to FIG. 5.

The ROM 134 comprises a 27C1001 128Kx8 ultraviolet erasable EPROM from NEC, or the like, in the first embodiment. The ROM 134 contains code for both the microcontroller 104 and the PDA 102. The ROM 134 may also contain code for standard external devices. The microcontroller 104 executes code in the ROM 134 to implement the described functions of the communication device 100. The microcontroller 104 also uploads code from the ROM 134 through the primary serial port 106 into the PDA 102. The PDA 102 executes this code to provide an interface with the microcontroller 104 and to support and control the functions of the communication device 100. After the code in the ROM 134 is loaded into the PDA 102, an operator of the combined PDA 102 and the communication device 100 can utilize the functions provided by both the PDA 102 and the communication device 100 by providing appropriate input commands to the PDA 102. The PDA 102 sends appropriate commands and data to the microcontroller 104 to control the functions of the communication device 100, as provided by the code in the ROM 134. The program executed by the microcontroller 104 is described in greater detail below with reference to FIG. 9. The microcontroller 104 can also download code to attached external devices.

The first embodiment of the communication device 100 provides the PDA 102 with access to three different communication media through the microcontroller 104 and the decoder/multiplexer 112. Specifically, the communication media include the phone modem 114, the GPS engine 120, and either the packet radio 124 or the cellular telephone 126. Each of the communication media is implemented in a separate communication circuit. As described above, the decoder/multiplexer 112 comprises a dual 1-to-4 decoder 136 and a dual 4-to-1 multiplexer 138. In the first embodiment, the decoder comprises a 74HC139 from Texas Instruments, or the like, while the multiplexer 138 comprises a 74HC153, also from Texas Instruments, or the like. The communication device 100 has a separate serial interface from the microcontroller 104, through the decoder/multiplexer 112 to each of the communication circuits 114, 120, 124 and 126. To implement these serial interfaces, the microcontroller 104 generates a single handshake signal and a single data signal to the decoder 136. The decoder 136 has four pairs of handshake and data outputs (output pair A, output pair B, output pair C and output pair D), to which the signals from the microcontroller 104 may be connected. The microcontroller 104 generates a pair of select signals on a pair of select lines 140 and 142 to the decoder 136. The two select signals have logical values of 00, 01, 10, or 11 to control the selection of one of the four output pairs of the decoder 136 to which the input pair is connected. The output pair A is connected to both the packet radio 124 and the cellular telephone 126; however, as discussed above, only one of the two devices is installed at any particular time in the present embodiment. The output pair B has only one line which is connected to the GPS engine 120. The output pair C is connected to the phone modem 114. The output pair D is unconnected in the present embodiment. Thus, the microcontroller 104 can send serial data to any of the installed communication circuits 114, 120 and either 124 or 126 by selecting the appropriate select signals.

The phone modem 114 also generates a handshake signal and a data signal for a serial interface which is connected to an input pair C on the multiplexer 138. The GPS engine 120 also generates a handshake signal and a data signal for a serial interface that is connected to an input pair B on the multiplexer 138. The packet radio 124 also generates a handshake signal and a data signal for a serial interface that is connected to an input pair A on the multiplexer 138. The cellular telephone 126 also generates a handshake signal and a data signal for a serial interface that is also connected to the input pair A on the multiplexer 138. The multiplexer 138 also has an output pair to which one of four input pairs is internally connected. This output pair of the multiplexer 138 is connected to the microcontroller 104. The microcontroller 104 controls the selection of the multiplexer 138 using the same select signals as described above with reference to the decoder 136. Thus, the microcontroller 104 can select an input pair to receive the serial interface signals from a selected one of the installed communication circuits 114, 120 and either 124 or 126.

The select lines from the microcontroller 104 are preferably connected to the decoder 136 and the multiplexer 138 so that the communication circuit 114, 120, 124 or 126 selected by the decoder 136 is also selected by the multiplexer at all times. Thus, for example, by controlling the select lines to select input pair C and output pair C, the microcontroller 104 generates a handshake and a data signal for a serial interface that is received by the phone modem 114. The microcontroller 104 can also receive a handshake and a data signal for a serial interface that are generated by the phone modem 114. Thus, the decoder/multiplexer 112 allows the microcontroller 104 to select between three different serial interfaces. A first serial interface allows the microcontroller 104 to communicate with the phone modem 114 and is described in greater detail below with reference to FIG. 6. A second serial interface allows the microcontroller 104 to communicate with the GPS engine 120 and is described in greater detail below with reference to FIG. 7. A third serial interface allows the microcontroller 104 to communicate with either the packet radio 124 or the cellular telephone 126 and is described in greater detail below with reference to FIG. 8.

Figure 5:
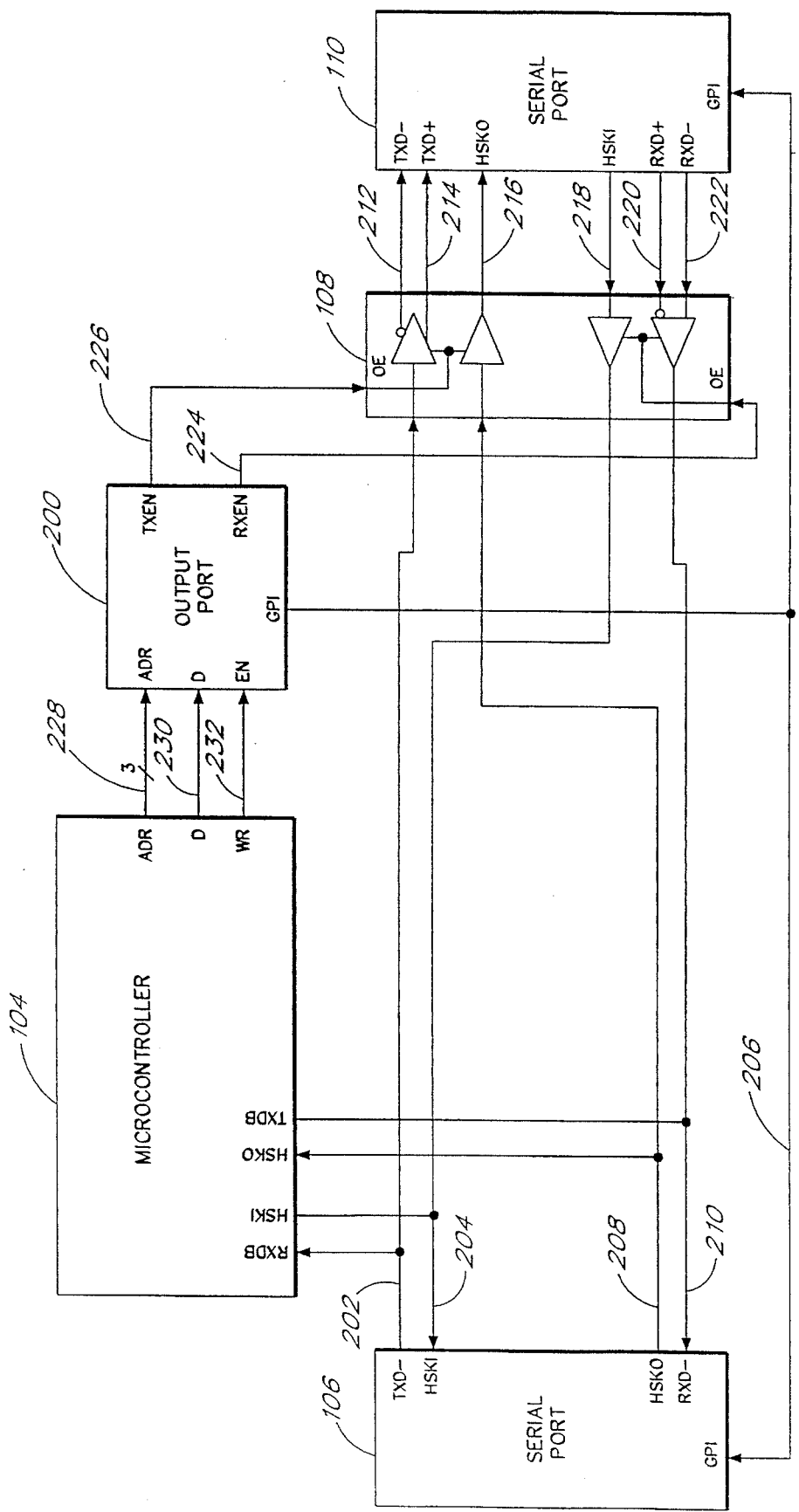
FIG. 5 is a more detailed functional block diagram of the serial interface between the microcontroller and the pair of serial ports of FIG. 4.

FIG. 5 is a more detailed functional block diagram of the serial interface between the microcontroller 104, the primary serial port 106 and the pass-thru serial port 110, shown in FIG. 4. The microcontroller 104 is connected to the primary serial port 106 and to the buffer 108 by a transmit data line 202, a handshake-in line 204, a handshake-out line 208 and a receive data line 210. The microcontroller 104 is connected to an output port 200 by a set of three address lines 228, a data line 230 and a write enable line 232. The output port 200 is connected to the primary serial port 106 and the serial port 110 by a GPI line 206. The output port 200 is connected to the buffer 108 by a receive enable line 224 and a transmit enable line 226. The buffer 108 is connected to the serial port 110 by a differential pair of transmit data lines 212 and 214, a handshake-out line 216, a handshake-in line 218, and a differential pair of receive data lines 220 and 222.

The microcontroller 104 receives an active low signal from the primary serial port 106 on the transmit data line 202 and another signal from the primary serial port 106 on the handshake-out line 208. The microcontroller 104 also generates an active low signal to the primary serial port 106 on the transmit data line 210 and another signal to the primary serial port 106 on the handshake-in line 204. A person of skill in the art will understand the use of these handshake and data signals to form a serial interface between the microcontroller 104 and the primary serial port 106. As described above, a serial port of a PDA 102 is connected to the primary serial port 106, so that the microcontroller 104 can communicate with the PDA 102 over the serial interface.

The output port 200 constitutes an eight-bit addressable latch, such as a 74HC259 from Texas Instruments, or the like. The output port 200 generates eight output data signals, three of which are applied to the receive enable line 224, the transmit enable line 226 and the GPI line 206, respectively. Other output signals of the output port 200 are described below with reference to FIGS. 6, 7 and 8. The output port 200 also receives signals on the set of three address lines 228 for selecting among the eight output signals. It also receives signals on the data line 230 and on the write enable line 232. The microcontroller 104 writes data to the output port 200 one bit at a time by controlling the address lines 228, the input data line 230 and the write enable line 232. The output port 200 decodes the signals on the address lines 228 to determine which output signal is written. When the signal on the write enable line 232 is activated, the output port 200 transfers the logic level at the input data line 230 to the corresponding output data signal.

The GPI line 206 is connected to both the primary serial port 106 and the serial port 110. The PDA 102 can receive a pulse on the GPI line 206 from either the microcontroller 104 through the output port 200 or from an external device through the serial port 110. Upon receiving a pulse on the GPI line 206, if the PDA 102 has gone into a sleep mode to conserve battery power, the PDA 102 "wakes up" and becomes fully operational. Either the microcontroller 104 or an external device can wake up the PDA 102 at any time. If the PDA 102 is not in a sleep mode when a pulse is received on the GPI line 206, the pulse will operate as an interrupt to the PDA 102. Also, the GPI line 206 can be used to allow the microcontroller 104 to wake up an external device. Thus, if an external device is in a sleep mode, the external device can be activated by receiving a pulse on the GPI line 206 from the microcontroller 104.

The transmit data line 202 carries an active low TTL signal from the primary serial port 106 to the buffer 108. The buffer 108 transforms the TTL signal on the transmit data line 202 to a differential signal on the transmit data lines 212 and 214. The transmit data lines 212 and 214 are connected between the buffer 108 and the serial port 110. The handshake-out line 208 carries the handshake-out signal from the primary serial port 106 to the buffer 108. The buffer 108 generates a signal on the handshake-out line 216 in response to the signal on the handshake-out line 208. The handshake-out line 216 is connected between the buffer 108 and the serial port 110. The output port 200 generates a signal on the transmit enable line 226, which is connected to the buffer 108. This signal enables or disables the gates in the buffer 108 that generate the signals on the transmit data lines 212 and 214 and on the handshake-out line 216. Thus, the serial port 110 receives the active low transmit data signal and the handshake-out signal from the primary serial port 106 only if the signal on the transmit enable line 228 is active.

If an external device is connected to the serial port 110, the external device applies a signal through the serial port 110 to the handshake-in line 218. The handshake-in line 218 is connected between the serial port 110 and the buffer 108. The buffer 108 generates a signal on the handshake-in line 204 in response to the signal on the handshake-in line 218. The handshake-in line 204 is connected between the buffer 108 and the primary serial port 106. If an external device is connected to the serial port 110, the external device generates a differential signal through the serial port 110 to the receive data lines 220 and 222. The receive data lines 220 and 222 are connected between the serial port 110 and the buffer 108. The buffer 108 generates a TTL signal on the receive data line 210 in response to the differential signal on the receive data lines 220 and 222. The output port 200 generates a signal on the receive enable line 224, which is connected to the buffer 108. This signal enables or disables the gates in the buffer 108 that generate the signals on the handshake-in line 204 and on the receive data line 210. Thus, by controlling the signal on the receive enable line 224, the microcontroller 104 can determine whether the handshake-in signals and the receive data signals from an external device are communicated through to the primary serial port 106. A person of skill in the art will understand the operation of the handshake and data signals between the serial port 110 and the primary serial port 106 for providing a serial interface between an external device and the PDA 102.

If the microcontroller 104 needs to use the serial interface between the microcontroller 104 and the PDA 102, the microcontroller 104 causes the signals on the transmit enable line 226 and on the receive enable line 224 to become inactive. This disables the serial interface between the external device at the serial port 110 and the PDA 102 at the primary serial port 106. Whenever the microcontroller 104 does not need to use the serial interface with the PDA 102, the microcontroller 104 sets the signals on the transmit enable line 226 and on the receive enable line 224 to active levels. This enables the buffer 108 and the serial interface between the external device at the serial port 110 and the PDA 102 at the primary serial port 106.

Figure 6:
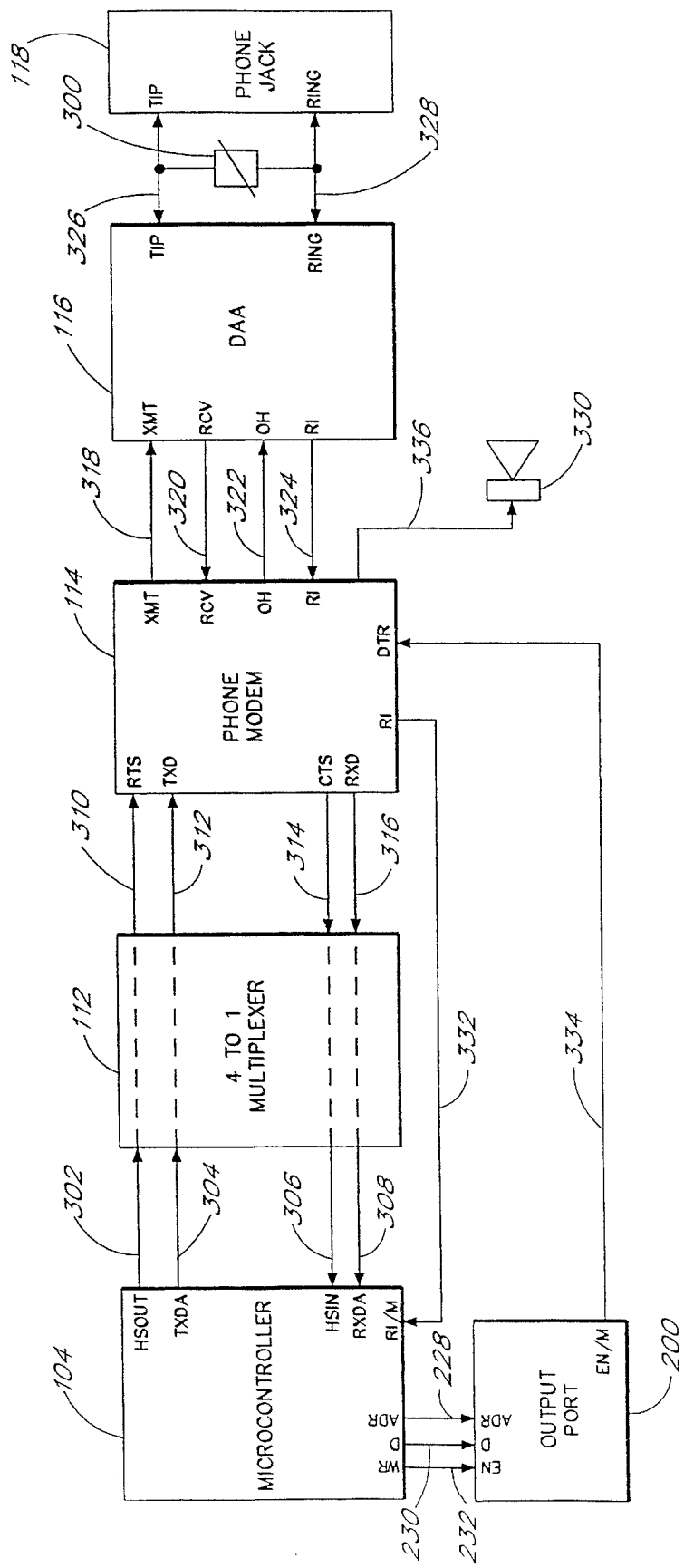
FIG. 6 is a more detailed functional block diagram of the phone modem interface of FIG. 4.

FIG. 6 is a more detailed functional block diagram of the interface between the microcontroller 104 and the phone modem 114. This interface comprises the microcontroller 104, the decoder/multiplexer 112, the phone modem 114, the DAA 116, the phone jack 118, the output port 200, a sound transducer 330, a lightning suppressor 300, the set of three address lines 228, the data line 230, the write enable line 232, a set of two handshake-out lines 302 and 310, a set of two transmit data lines 304 and 312, a set of two handshake-in lines 306 and 314, a set of two receive data lines 308 and 316, a transmit line 318, a receive line 320, an off-hook line 322, a set of two ring indicator lines 324 and 332, a tip line 326, a ring line 328, an audio line 336 and an enable modem line 334.

The microcontroller 104 generates signals on the handshake-out line 302 and on the transmit data line 304. The microcontroller 104 also receives signals on the handshake-in line 306 and on the receive data line 308. The handshake-out line 302, the transmit data line 304, the handshake-in line 306 and the receive data line 308 are connected between the microcontroller 104 and the decoder/multiplexer 112. As described above with reference to FIG. 4, if the phone modem 114 is selected for communication with the microcontroller 104, the decoder/multiplexer 112 transfers the signal on the handshake-out line 302 to the handshake-out line 310; it transfers the signal on the transmit data line 304 to the transmit data line 312; it transfers a signal on the handshake-in line 314 to the handshake-in line 306; and it transfers a signal on the receive data line 316 to the receive data line 308. The handshake-out line 310 is connected between the decoder/multiplexer 112 and a ready-to-send input of the phone modem 114. The transmit data line 312 is connected between the decoder/multiplexer 112 and a transmit data input of the phone modem 114. The handshake-in line 314 is connected between a clear-to-send output of the phone modem 114 and the decoder/multiplexer 112. The receive data line 316 is connected between a receive data output of the phone modem 114 and the decoder/multiplexer 112. A person of skill in the art will understand that the handshake-out lines 302, 310, the transmit data lines 304, 312, the handshake-in lines 306, 314 and the receive data lines 308, 316 form a serial interface between the microcontroller 104 and the phone modem 114.

In the preferred embodiments, the phone modem 114 comprises a Rockwell SM224ATF single-chip modem. This phone modem 114 can perform standard facsimile and modem functions and is controlled using a standard Hayes® compatible protocol. In an alternative embodiment, the phone modem 114 also generates and receives a pair of analog audio signals. These audio signals can be applied to lines connected between the phone modem 114 and the cellular telephone 126. In this alternative embodiment, information can be transferred between the cellular telephone 126 and the microcontroller 104 and between the cellular telephone 126 and the phone modem 114.

The transmit line 318, the receive line 320, the off-hook line 322 and the ring indicator line 324, are connected between the phone modem 114 and the DAA 116. The phone modem 114 applies data to the transmit line 318, while the DAA 116 applies received data to the receive line 320. The DAA 116 activates a signal on the ring indicator line 324 to alert the phone modem 114 to an incoming phone call. The phone modem 114 activates the signal on the off-hook line 322 to cause the DAA 116 to activate the telephone connection. A person of skill in the art will understand the operation of the interface between the phone modem 114 and the DAA 116, as well as the operation of the DAA 116.

The ring indicator line 332 is connected between the phone modem 114 and the microcontroller 104. The phone modem 114 activates a signal on the ring indicator line 332 in response to an active signal on the ring indicator line 324 from the DAA 116. The microcontroller 104 receives the signal on the ring indicator line 332 at a modem ring indicator input of the microcontroller 104. The modem enable line 334 is connected between a DTR input of the phone modem 114 and one of the eight output signals generated by the output port 200. As described above, the microcontroller 104 controls the output signals of the output port 200 by controlling the set of three address lines 228, the data line 230 and the write enable line 232. The microcontroller 104 activates the signal on the modem enable line 334 to enable the phone modem 114 to send or receive data. The audio line 336 is connected between the phone modem 114 and the sound transducer 330. The phone modem 114 generates a signal on the audio line 336 to activate the sound transducer 330 to provide audio indicators to the user of the PDA 102. The tip line 326 and the ring line 328 are each connected between the DAA 116, the phone jack 118 and the surge suppressor 300. A person of skill in the art will understand the operation of the tip and ring signals for incoming and outgoing calls. The lightning suppressor 300 protects the DAA 116 from voltage spikes on the telephone lines caused by lightning. The phone jack 118 is mounted at an outside surface of the communication device 100, as illustrated in FIGS. 2 and 3.

Figure 7:
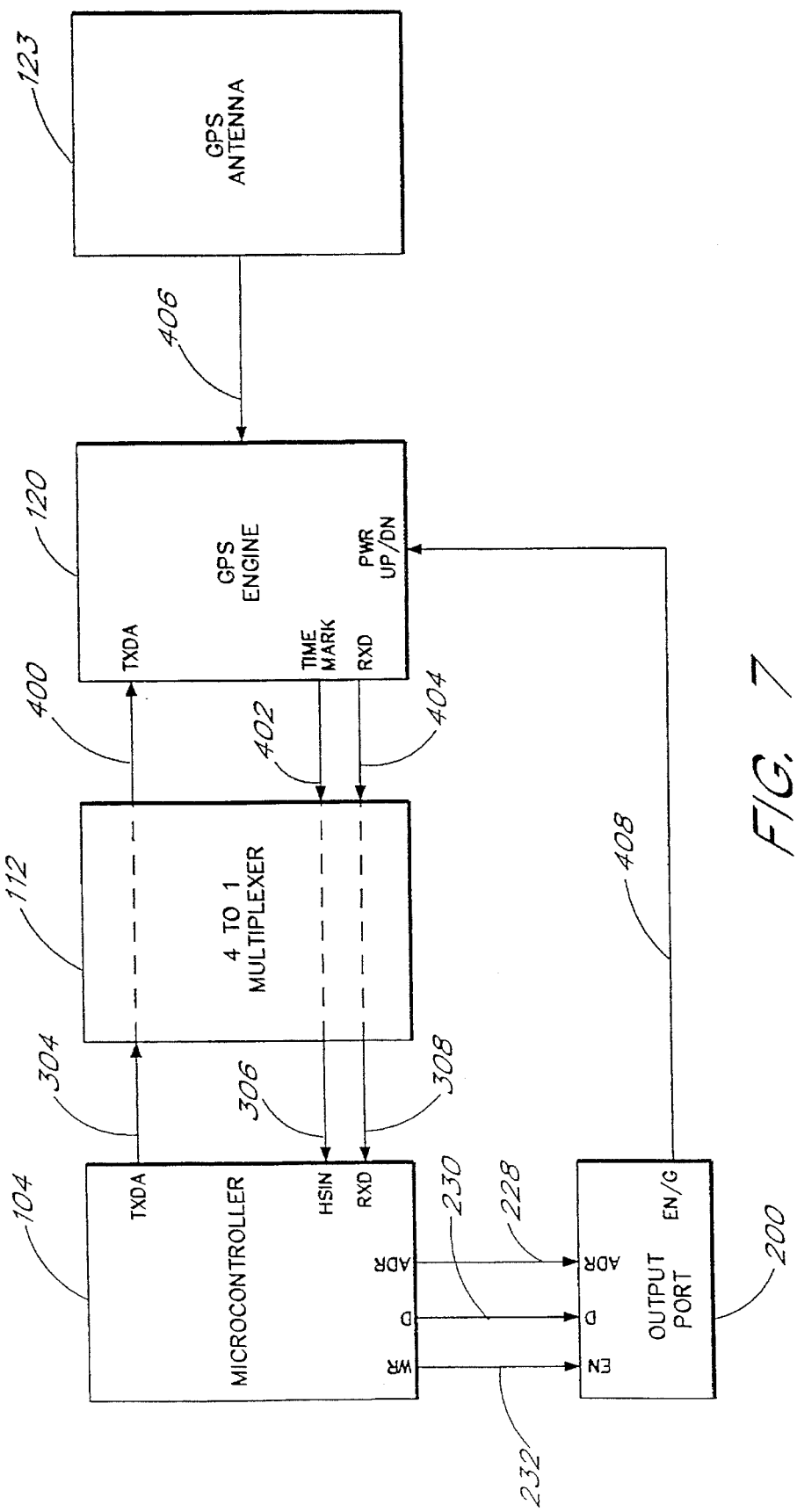
FIG. 7 is a more detailed functional block diagram of the GPS engine interface of FIG. 4.

FIG. 7 is a more detailed functional block diagram of the interface between the microcontroller 104 and the GPS engine 120. This interface comprises the microcontroller 104, the decoder/multiplexer 112, the GPS engine 120, the GPS antenna 123, the output port 200, the set of three address lines 228, the data line 230, the write enable line 232, the transmit data line 304, a transmit data line 400, the handshake-in line 306, a handshake-in line 402, the receive data line 308, a receive data line 404, a GPS antenna line 406 and an enable GPS line 408.

The microcontroller 104 generates a signal on the transmit data line 304, which is connected between the microcontroller 104 and the decoder/multiplexer 112. The microcontroller 104 also receives signals on the handshake-in line 306 and on the receive data line 308, which are also connected between the microcontroller 104 and the decoder/multiplexer 112. As described above with reference to FIG. 4, if the GPS 120 is selected for communication with the microcontroller 104, the decoder/multiplexer 112 transfers the signal on the transmit data line 304 to the transmit data line 400; it transfers a signal on the handshake line 402 to the handshake-in line 306; and it transfers a signal on the receive data line 404 to the receive data line 308. The transmit data line 400 is connected between the decoder/multiplexer 112 and a transmit data input of the GPS engine 120. The handshake-in line 402 is connected between a time mark output of the GPS engine 120 and the decoder/multiplexer 112. The receive data line 404 is connected between a receive data output of the GPS engine 120 and the decoder/multiplexer 112. A person of skill in the art will understand that the transmit data lines 304, 400, the handshake-in lines 306, 402 and the receive data lines 308, 404 form a serial interface between the microcontroller 104 and the GPS engine 120.

The GPS engine 120 comprises a Rockwell NavCore® VI MicroTracker™ Global Positioning System circuit card. The GPS engine 120 receives commands from the microcontroller 104 over the transmit data lines 304 and 400. The microcontroller 104 can use these commands to control a number of aspects of the operation of the GPS engine 120, such as a selection of the satellites utilized for computing the location of the communication device 100 and the frequency at which the GPS engine 120 makes this computation. The GPS antenna 123 receives electromagnetic signals transmitted from GPS satellites. The GPS antenna 123 applies these signals to the GPS antenna line 406 connected between the GPS antenna 123 and the GPS engine 120. The GPS engine 120 utilizes the signals received from the satellites to calculate the location of the communication device 100 in terms of longitude, latitude and altitude. The GPS enable line 408 is connected between the output port 200 and the GPS engine 120. The output port 200 applies one of its eight output signals to the GPS enable line 408. As described above with reference to FIG. 4, the microcontroller 104 controls the GPS enable line 408 by controlling the set of three address lines 228, the data line 230 and the write enable line 232. The microcontroller 104 enables the GPS engine 120 to send commands to the GPS engine 120 or receive data back from the GPS engine 120.

Figure 8:
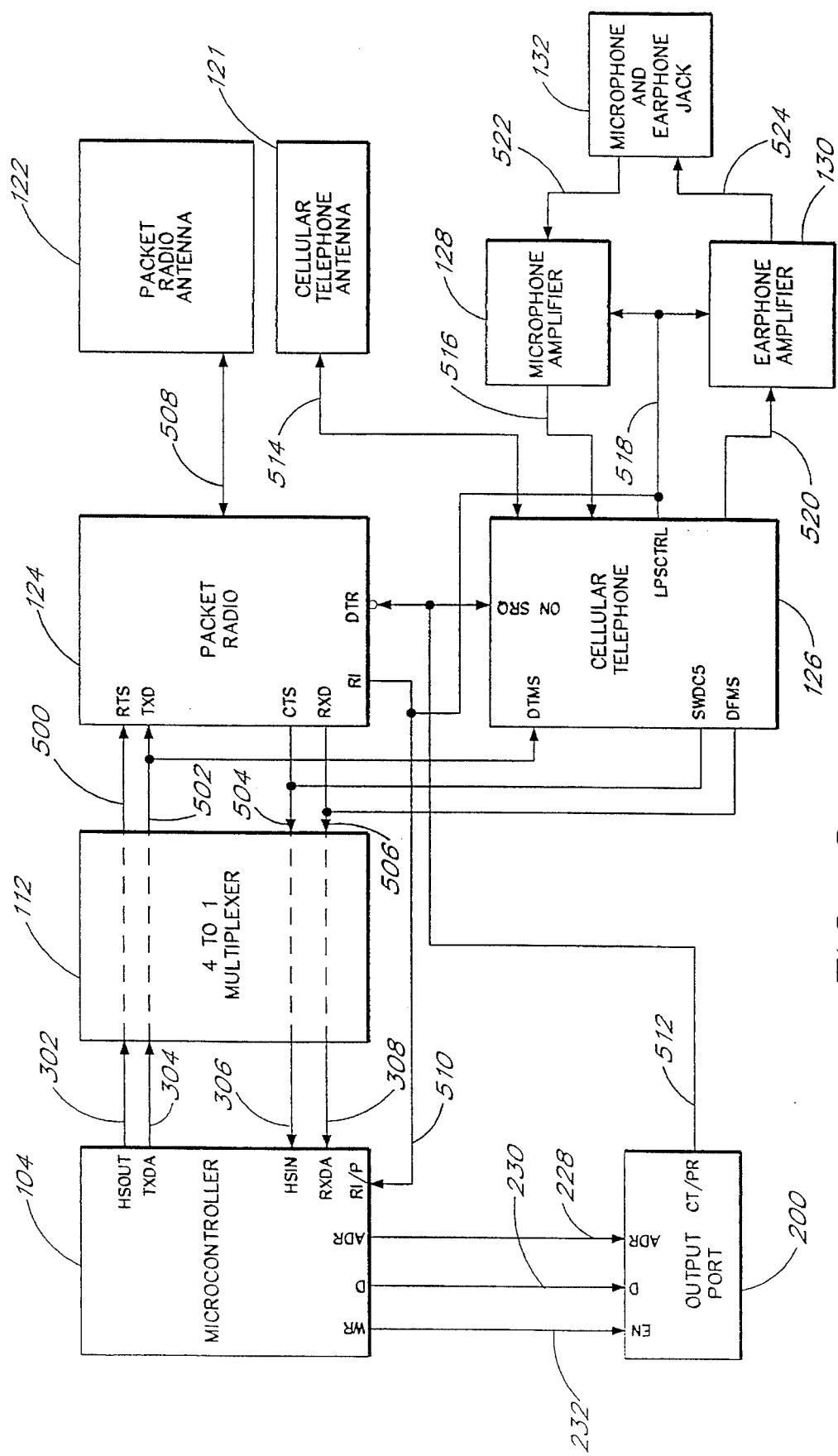
FIG. 8 is a more detailed functional block diagram of the packet radio interface and the cellular telephone interface of FIG. 4.

FIG. 8 is a more detailed functional block diagram of the interface between the microcontroller 104 and either the packet radio 124 or the cellular telephone 126, whichever communication circuit is inserted. This interface comprises the microcontroller 104, the decoder/multiplexer 112, the packet radio 124, the cellular telephone 126, the packet radio antenna 122, the cellular telephone antenna 121, the microphone amplifier 128, the earphone amplifier 130, the microphone and earphone jack 132, the output port 200, the set of three address lines 228, the data line 230, the write enable line 232, the handshake-out line 302, a handshake-out line 500, the transmit data line 304, a transmit data line 502, the handshake-in line 306, a handshake-in line 504, the receive data line 308, a receive data line 506, a packet radio antenna line 508, a ring indicator line 510, a cellular telephone antenna line 514, a cellular telephone/packet radio enable line 512, a set of two microphone audio lines 516 and 522, an LPS control line 518, and a set of two earphone audio lines 520 and 524.

The microcontroller 104 generates signals on the handshake-out line 302 and on the transmit data line 304, which are connected between the microcontroller 104 and the decoder/multiplexer 112. The microcontroller 104 also receives signals on the handshake-in line 306 and on the receive data line 308, which are also connected between the microcontroller 104 and the decoder/multiplexer 112. As described above with reference to FIG. 4, if the packet radio 124 or the cellular telephone 126 is selected for communication with the microcontroller 104, the decoder/multiplexer 112 transfers the signal on the handshake-out line 302 to the handshake-out line 500; it transfers the signal on the transmit data line 304 to the transmit data line 502; it transfers a signal on the handshake-in line 504 to the handshake-in line 306; and it transfers a signal on the receive data line 506 to the receive data line 308. The handshake-out line 500 is connected between the decoder/multiplexer 112 and a ready-to-send input of the packet radio 124. The transmit data line 502 is connected between the decoder/multiplexer 112 and a transmit data input of the packet radio 124 or a DTMS input of the cellular telephone 126. The handshake-in line 504 is connected between a clear-to-send output of the packet radio 124 or an SWDC5 output of the cellular telephone 126 and the decoder/multiplexer 112. The receive data line 506 is connected between a receive data output of the packet radio 124 or a DFMS output of the cellular telephone 126 and the decoder/multiplexer 112. A person of skill in the art will understand that the handshake-out lines 302, 500, the transmit data lines 304,502, the handshake-in lines 306,504 and the receive data lines 308, 506 form a serial interface between the microcontroller 104 and either the packet radio 124 or the cellular telephone 126.

In the preferred embodiments, the packet radio 124 comprises a GE/Ericson Moby Pack. The packet radio 124 is connected to the antenna 122 by the packet radio line 508. The microcontroller 104 sends control commands and packets of data to the packet radio 124 over the above-described serial interface. The packet radio 124 generates a signal on the antenna line 508 to the antenna 122 to transmit the data to a base unit, as is well-known in the art. The antenna 122 also receives data from base units and applies the data to the antenna line 508. The packet radio 124 receives this data and relays the data to the microcontroller 104 over the above-described serial interface. When the packet radio 124 initially receives data from a remote source, the packet radio 124 activates a ring indicator output signal. The ring indicator output signal is applied to the ring indicator line 510 connected between the packet radio 124 and the microcontroller 104. This signal alerts the microcontroller 104 to receive the incoming data.

The cellular telephone/packet radio enable line 512 is connected between the output port 200 and a DTR input of the packet radio 124 or an ON SRQ input of the cellular telephone 126. The DTR input of the packet radio 124 is active low, while the ON SRQ input of the cellular telephone 126 is active high. Thus, when the signal on the cellular telephone/packet radio enable line 512 is low, the packet radio 124 is enabled and the cellular telephone 126 is disabled. Conversely, when the signal is high, the packet radio 124 is disabled and the cellular telephone 126 is enabled. Thus, it is necessary for the microcontroller 104 to send the correct enable signal to whichever communication circuit (either the packet radio 124 or the cellular telephone 126) is installed in order to activate the installed circuit. This helps preclude having the wrong software attempt to operate the installed circuit. This signal is one of the eight output signals of the output port 200. As described above, the microcontroller 104 can control this signal by controlling the set of address lines 228, the data line 230 and the write enable line 232. Thus, the microcontroller 104 can enable the desired communication circuit 124 or 126.

In the preferred embodiments, the cellular telephone 126 comprises a GE/Ericson Mary Beth circuit card. The microphone and earphone jack 132 is mounted at an outside surface of the communication device 100, as illustrated in FIGS. 2 and 3. An external microphone and earphone set can be plugged into the microphone and earphone jack 132 to allow a telephone conversation between the user of the PDA 102 and a remote party, using the cellular telephone 126. The external microphone applies an audio signal to the audio line 522, through the microphone and earphone jack 132. The audio line 522 is connected between the earphone amplifier 128 and the microphone and earphone jack 132. The microphone amplifier 128 receives the signal on the audio line 522 and amplifies the signal to generate a signal on the audio line 516. The audio line 516 is connected between the microphone amplifier 128 and the cellular telephone 126. The cellular telephone 126 then receives the audio signal from the audio line 516.

The cellular telephone 126 generates a signal on the cellular telephone antenna line 514 that is connected to the antenna 121, for transmission to a cellular cell site. The signal generated by the cellular telephone 126 on the antenna line 514 represents audio signals received from the microphone and earphone jack 132.

The antenna 121 also receives signals from the cellular cell site and applies these signals to the antenna line 514. The cellular telephone 126 receives the signal on the line 514 and, in response thereto, generates an audio signal on the earphone audio line 520. The audio line 520 is connected between the cellular telephone 126 and the earphone amplifier 130. The earphone amplifier 130 amplifies the signal on the audio line 520 and generates a new signal on the audio line 524. The audio line 524 is connected between the earphone amplifier 130 and the microphone and earphone jack 132. The signal on the audio line 524 drives the external earphone connected to the microphone and earphone jack 132 to allow the user of the PDA 102 to listen to a remote party.

The cellular telephone 126 receives commands from the microcontroller 104 over the transmit data lines 302 and 502 to control the operation of the cellular telephone 126. The cellular telephone 126 also communicates information to the microcontroller 104 via the above-described serial interface.

The LPS control line 518 is connected to the microphone amplifier 128, the earphone amplifier 130 and the ring indicator line 510. The cellular telephone 126 activates a signal on the LPS control line 518 in response to either a command from the microcontroller 104 or in response to receiving an incoming telephone call. An active signal on the LPS control line 518 enables the amplifiers 128 and 130. In addition, an active signal on the LPS control line 518 is received at a ring indicator input of the microcontroller 104, over the ring indicator line 510. Thus, the cellular telephone 126 alerts the microcontroller 104 upon receiving an incoming call.

Figure 9A:
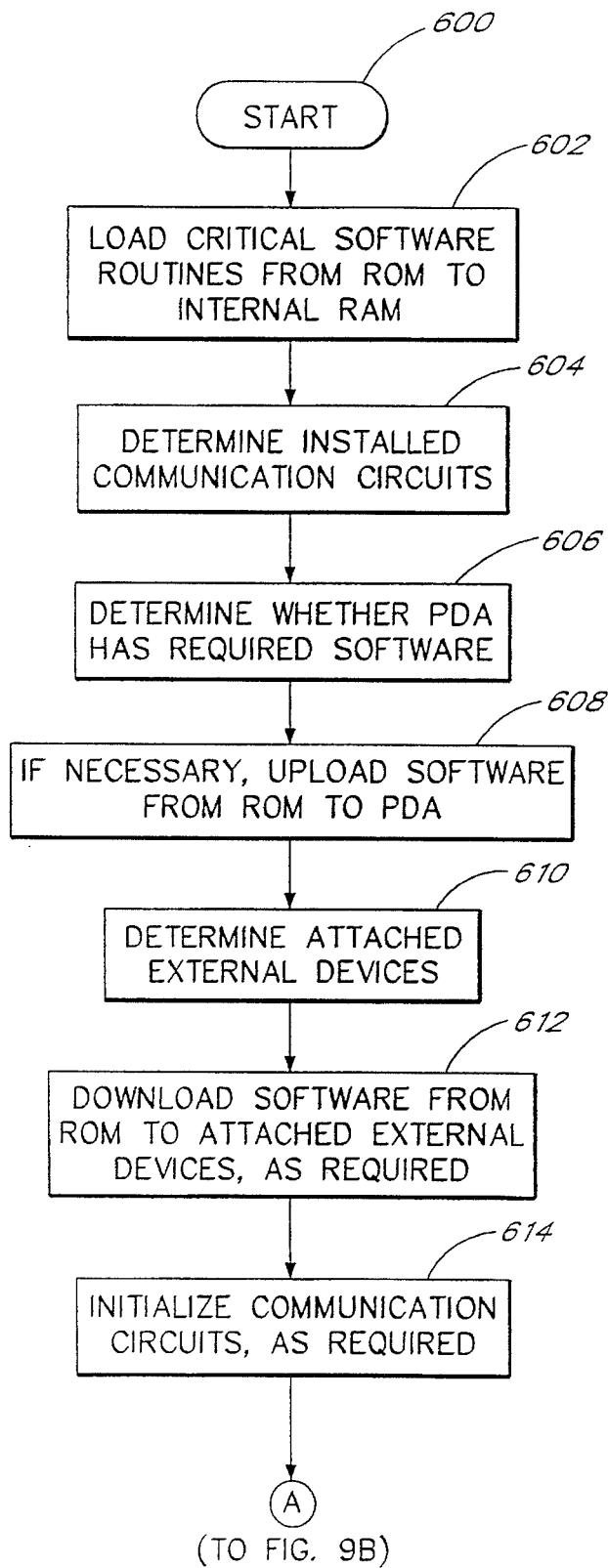
FIGS. 9A, 9B and 9C illustrate a flow chart of a computer program executed by the microcontroller of FIG. 4.
Figure 9B:
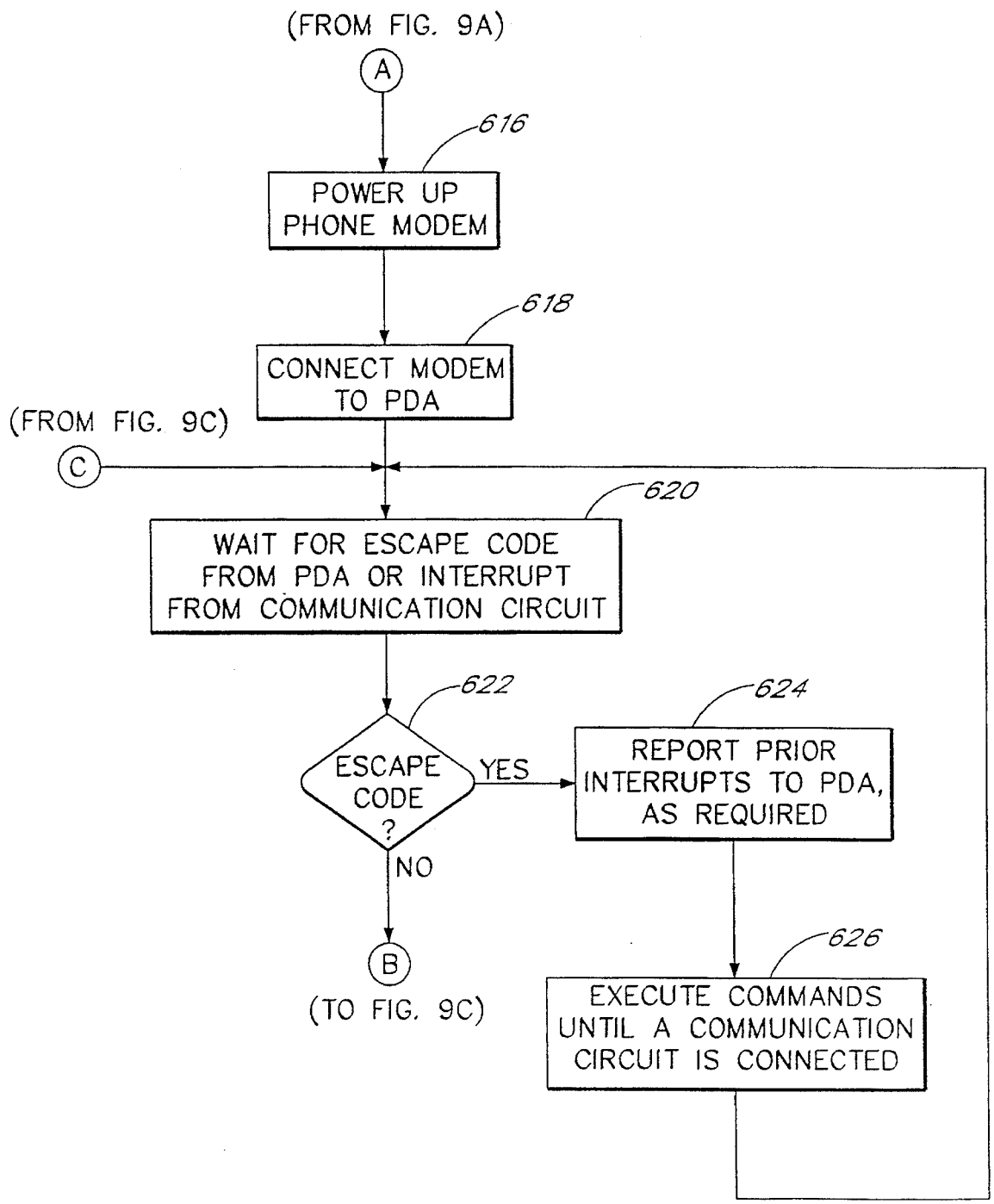
Figure 9C:
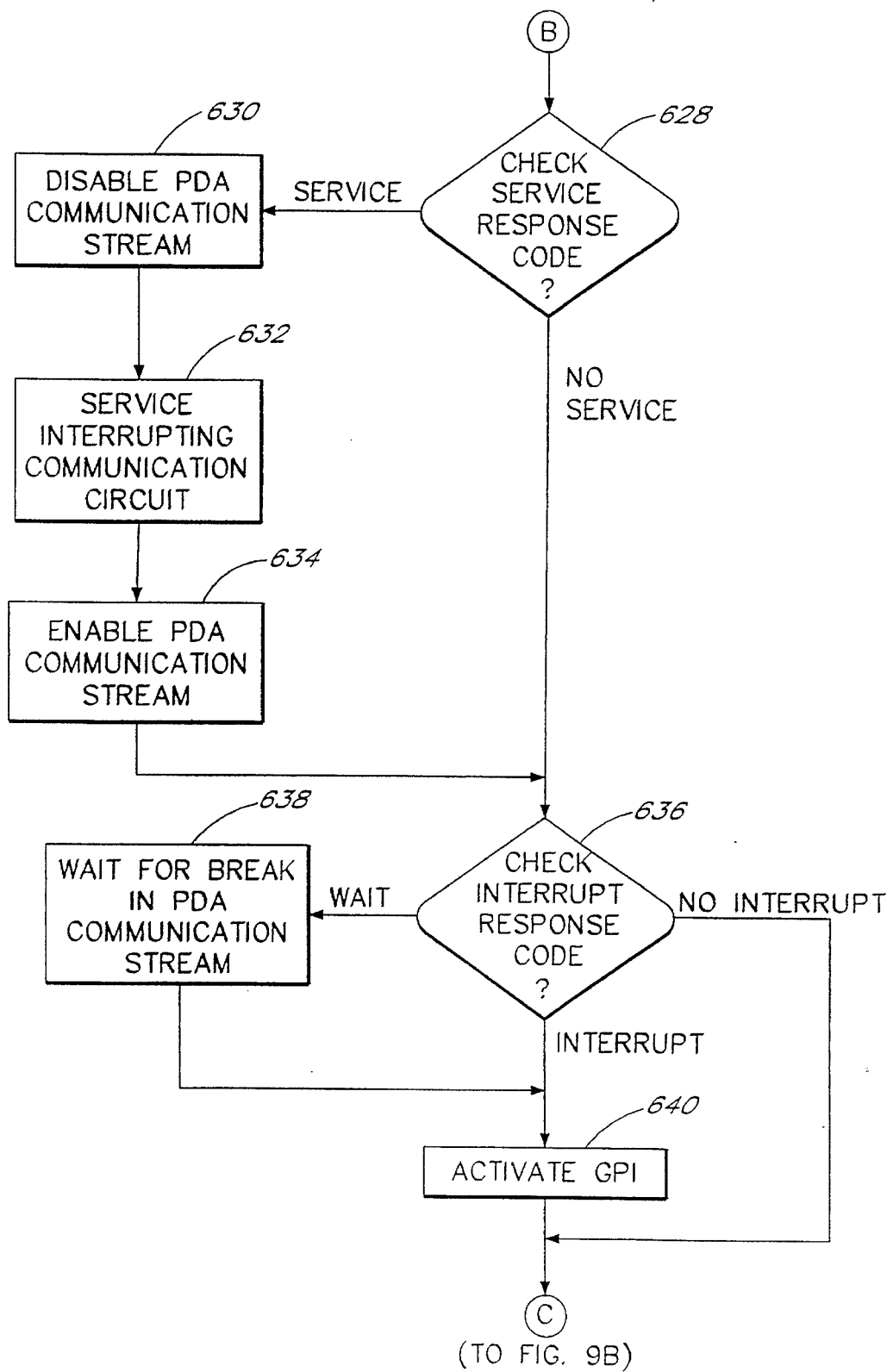

FIGS. 9A, 9B and 9C illustrate a flow chart representing the software that is executed by the microcontroller 104 of the communication device 100. When the communication device 100 is initially powered up, the microcontroller 104 begins executing at a block 600, as shown in FIG. 9A. At a process block 602, the microcontroller 104 accesses the ROM 134 and loads small portions of the software into random access memory (RAM) inside the microcontroller 104. Preferably, the software routines that are loaded into internal RAM are the routines that are generally executed most frequently. The microcontroller 104 executes routines that are not loaded into RAM by directly accessing the ROM 134.

At a process block 604, the microcontroller 104 sends messages over each of the above-described serial interfaces between the microcontroller 104 and the communication circuits 114, 120, 124, 126. The microcontroller 104 waits for a response from each of the communication circuits 114, 120, 124, 126. This exchange of messages allows the microcontroller 104 to determine which of the communication circuits 114, 120, 124, 126 have been installed inside the communication device 100.

At a process block 606, the microcontroller 104 sends a message to the PDA 102 over the primary serial port 106. The response from the PDA 102 indicates whether software must be uploaded to the PDA 102. Upon receiving this response from the PDA 102, the microcontroller 104 proceeds to a process block 608. At the process block 608, the microcontroller 104 reads code from the ROM 134 and transfers it to the PDA 102 over the primary serial port 106, if the previous response from the PDA 102 indicated that an upload was necessary. The required software can be uploaded to the PDA 102 by an appropriate method, as required by the PDA 102. For example, the Apple™ Newton™ has a well-defined method for uploading software from its serial port. As described above, the software that is uploaded to the PDA 102 provides the user of the PDA 102 with access to the functions provided by the communication device 100. The software uploaded into the PDA 102 provides an interface with the hardware and the software of the communication device 100.

At a process block 610, the microcontroller 104 sends messages to any attached external devices through the pass-thru serial port 110. Each of the attached external devices, if any, responds to the microcontroller 104 through the pass-thru serial port 110. These responses allow the microcontroller 104 to determine the types of external devices that are attached to the pass-thru serial port 110.

The microcontroller 104 proceeds to a process block 612. As described above, the ROM 134 may contain code that can be downloaded to external devices through the pass-thru serial port 110. If the ROM 134 contains code for one or more of the attached external devices, and one or more of those attached external devices require a software download, the microcontroller 104 reads the appropriate code from the ROM 134 and transfers it to the appropriate external devices through the pass-thru serial port 110.

At a process block 614, the microcontroller 104 initializes each of the installed communication circuits 114, 120, 124,126, as required. For example, the microcontroller 104 may initiate a warm start in the GPS engine 120 by sending an appropriate command over the serial interface connecting the microcontroller 104 with the GPS engine 120. This warm start allows the GPS engine 120 to respond more quickly to a request from the PDA 102 for location data. As another example, the microcontroller 104 may send appropriate commands to program the cellular telephone 126, if the cellular telephone 126 has not yet been programmed.

At a process block 616, as shown in FIG. 9B, the microcontroller 104 powers up the phone modem 114 by activating the signal on the modem enable line 334, as shown in FIG. 6. At a process block 618, the microcontroller 104 causes the decoder/multiplexer 112 to select the phone modem 114 for on-line operation by applying appropriate signals to the select lines 140 and 142, as shown in FIG. 4.

At a process block 620, the microcontroller 104 enters a monitor mode. In the monitor mode, the microcontroller 104 emulates a modem and relays data between the PDA 102 and the communication circuit 114, 120, 124, 126 that is currently on-line, while monitoring the communication stream generated by the PDA 102 for escape codes. The microcontroller 104 continues to relay data between the PDA 102 and the on-line communication circuit 114, 120, 124, 126, until it receives either an escape code from the PDA 102 or an interrupt from one of the communication circuits 114, 120, 124 or 126 that is not selected for on-line operation. The phone modem 114 can interrupt the microcontroller 104 by applying an active signal to the ring indicator line 332, as shown in FIG. 6. Either the packet radio 124 or the cellular telephone 126 can interrupt the microcontroller 104 by activating the signal on the ring indicator line 510. Upon receiving either an escape code from the PDA 102 or an interrupt from an off-line communication circuit 114, 120, 124 or 126, the microcontroller 104 advances to a decision block 622.

At the decision block 622, the microcontroller 104 determines whether it received an escape code or an interrupt. If the microcontroller 104 received an escape code, then the microcontroller 104 advances to a process block 624. Otherwise, the microcontroller 104 advances to a decision block 628, as shown on FIG. 9C. At the process block 624, the microcontroller 104 reports any prior interrupts that have not yet been reported to the PDA 102. Specifically, the microcontroller 104 sends a message to the PDA 102 indicating which communication circuits 114,120,124 or 126 have interrupted the microcontroller 104. After reporting the prior interrupts, the microcontroller 104 advances to a process block 626.

At the process block 626, the microcontroller 104 enters a command mode. In this mode, the PDA 102 can send a series of commands to the microcontroller 104 for controlling the communication circuits 114, 120, 124 and 126. Examples of possible commands that can be sent to the microcontroller 104 include commands to power off the communication device 100, to wake up the PDA 102 upon receipt of an incoming cellular call, to select a communication circuit 114, 120, 124, 126 for on-line operation, to idle at low power and to check different status conditions. The microcontroller 104 continues to execute commands received from the PDA 102 until the microcontroller 104 has selected a communication circuit 114, 120, 124 or 126 for on-line operation in response to a command from the PDA 102. At this point, the microcontroller 104 returns to the process block 620.

At the decision block 628, the microcontroller 104 checks the service response code for the communication circuit 114, 120, 124 or 126 that generated the interrupt. The service response code indicates whether there are any actions that the microcontroller 104 should automatically perform in response to the interrupt. If the service response code indicates that the interrupt does not require service, then the microcontroller 104 advances to a decision block 636. If the service response code indicates that the interrupt does require servicing, then the microcontroller 104 advances to a process block 630.

At the process block 630, the microcontroller 104 disables the serial interface between the PDA 102 and the communication circuit 114,120, 124 or 126 that is currently selected for on-line operation. The microcontroller 104 disables this interface using the handshake lines 204, 208, 302 and 306, as is well known in the art. At a decision block 632, the microcontroller 104 performs the appropriate steps to service the current interrupt from the communication circuit 114,120, 124 or 126. The steps performed during the process block 632 depend on the particular communication circuit 114, 120, 124 or 126 generating the interrupt and on the instructions that have been previously received from the PDA 102 related to the particular communication circuit 114, 120, 124 or 126. For example, the cellular telephone 126 generates an interrupt to the microcontroller 104 on the ring indicator line 510 upon receiving an incoming call. If the PDA 102 has previously set the cellular telephone 126 to an automatic answering mode inside the microcontroller 104, the microcontroller 104 causes the cellular telephone 126 to answer the incoming call during the process block 632. Specifically, the microcontroller 104 temporarily disables the interface between the PDA 102 and the communication circuit 114, 120 or 124 that has been selected for on-line operation and causes the decoder/multiplexer 112 to select the cellular telephone 126. The microcontroller 104 then generates appropriate commands to cause the cellular telephone 126 to answer the incoming call. The user of the PDA 102 can then begin a telephone conversation with the remote caller using an external microphone and earphone connected to the microphone and earphone jack 132. After controlling the cellular telephone 126 to answer the incoming call, the microcontroller 104 controls the decoder/multiplexer 112 to again select the communication circuit 114, 120 or 124 that had previously been selected for on-line operation. At a process block 634, the microcontroller 104 again enables the interface between the PDA 102 and the communication circuit 114,120, 124 or 126 by controlling the handshake lines 204,208, 302 and 306. After the process block 634, the microcontroller 104 advances to the decision block 636.

At the decision block 636, the microcontroller 104 checks the interrupt response code corresponding to the communication circuit 114,120,124 or 126 that generated the interrupt. The interrupt response code has been previously set by the PDA 102 by a command to the microcontroller 104. The interrupt response code indicates whether the microcontroller 104 should immediately interrupt the PDA 102, whether it should cause a delayed interrupt of the PDA 102, or whether it should not interrupt the PDA 102 at all. If the interrupt response code indicates that the microcontroller 104 should not interrupt the PDA 102, the microcontroller 104 returns to the process block 620. If the interrupt response code indicates that the microcontroller 104 should immediately interrupt the PDA 102, then the microcontroller 104 advances to a process block 640. If the interrupt response code indicates that the microcontroller 104 should perform a delayed interrupt, the microcontroller 104 advances to a process block 638. At the process block 638, the microcontroller 104 monitors the communication stream between the PDA 102 and the communication circuit 114, 120,124 or 126 that has been selected for on-line operation. When the microcontroller 104 detects a break in the communication stream, the microcontroller 104 advances to the process block 640. At the process block 640, the microcontroller 104 activates the GPI line 206, illustrated in FIG. 5, to cause an interrupt to the PDA 102. The response of the PDA 102 to the interrupt on the GPI line 206 depends on the application program running on the PDA 102, if any. After the process block 640, the microcontroller 104 returns to the process block 620 of FIG. 9B.

As discussed above, the PDA 102 executes software that allows the PDA 102 to interface with and control the communication device 100. This software sends commands to the microcontroller 104 when the microcontroller 104 is in the command mode, and it sends data to the on-line communication circuit 114, 120, 124, 126 when the microcontroller 104 is in the monitor mode. The format and the content of the data sent to the different communication circuits 114,120,124,126 complies with the requirements of the particular communication circuits 114, 120, 124, 126. For example, the data sent to the phone modem 114 complies with the standard Hayes® format for modems.

As described above, the communication software for the PDA 102 is uploaded to the PDA 102 from the ROM 134, and the software extends the capabilities of the PDA 102. As an example, the software is described in terms of using an Apple™ Newton® as the PDA 102. In this case, the system preferences are extended to provide user access to the functions of the communication device. For example, the standard functions of Print, Fax, Mail and Call are modified to operate the communication circuits 114, 120, 124, 126 of the communication device 100. Thus, the Call function places a cellular telephone call if the cellular telephone 126 is currently on-line. Alternatively, the Fax function sends a facsimile over the phone modem 114 if the phone modem is currently on-line. The system preferences are also extended to display information about the communication device 100. For example, if a packet of data is received at the packet radio 124, the In Box of the PDA 102 reflects the reception of this message.

Although extending the Newton system preferences provides a powerful interface with the communication device 100, not all of the functions of the communication device 100 can be conveniently controlled by this method. Consequently, one or more application programs are also provided that allow more complete control of the functions of the communication device 100. For example, one application program can be used to control different functions of the cellular telephone 126, such as programming the cellular telephone 126 or placing a phone call.

The Intelligent Assistant™ of the Newton is also extended to understand commands for the communication device 100. Thus, for example, a user can write the phrase "Where am I?" on the LCD display 78 using the light pen 76. The extended Intelligent Assistant™ understands this as a command to activate the GPS engine 120 to determine the current location of the communication device 100. The PDA 102 generates the appropriate commands to the communication device 100 to obtain the requested data from the GPS engine 120. The Intelligent Assistant™ preferably utilizes the above-described application programs to control many functions of the communication device 100.

The software uploaded to the PDA 102 also includes proto end points, as defined by Apple™ specifications, that facilitate interfacing with the communication device 100 and controlling the operation of the communication device 100. These proto end points can be used by other application programs to access the communication device 100.

The portable multiple integrated communication device 100 of the present invention provides versatile utilization of the communication circuits 114, 120, 124, 126. Data is channeled from a communication circuit 114, 120, 124 or 126, through the microcontroller 104, to the PDA 102. The data can then be rerouted to any of the other communication circuits 114, 120, 124, 126. This data flow versatility allows the different functions of the communication device 100 to be utilized in various combinations to provide numerous more complex functions. For example, the GPS engine 120 can be used in conjunction with the packet radio 124 to form an automated tracking system. The GPS engine 120 can periodically generate location data to the PDA 102. This information can automatically be transmitted to an office computer using the packet radio 124, providing personnel at the office with continuous access to data indicating the location of the communication device 100, and consequently, the person using it. Also, in the alternative embodiment described above, involving a phone modem 114 that has analog audio input and output capabilities, data can be transferred directly between the cellular telephone 126 and the phone modem 114, further expanding the possibilities. For example, digital data can be transmitted over the cellular interface by routing the data from the PDA 102, through the microcontroller 104 and the phone modem 114, to the cellular telephone 126. The phone modem 114 converts the digital data into a format that is compatible with cellular technology.

The communication device 100 of the present invention can also be implemented with other optional devices or features. For example, an optional lamp 135, as illustrated in FIG. 4, can be controlled by the microcontroller 104 to illuminate the LCD display 78. Also, other units can be used to replace the communication circuits 114, 120, 124, 126 of the present embodiment. These other units need not be communication circuits, either.

Second Embodiment

FIGS. 10 to 15C illustrate a second embodiment 100B of the portable multiple integrated communication device of the present invention. Many of the implementation details that have been described above with respect to the first embodiment 100 also apply to the second embodiment 100B. As a result, the present description of the second embodiment 100B focuses on differences between the two embodiments. A person of skill in the art can apply the more specific teachings described above with respect to the first embodiment 100 to the more general teachings described below with respect to the second embodiment 100B to fully implement the second embodiment 100B. For example, the communication device 100B has a power supply that is similar to the power supply 146 of the communication device 100, although FIGS. 10–15C do not illustrate a power supply.

Figure 10:
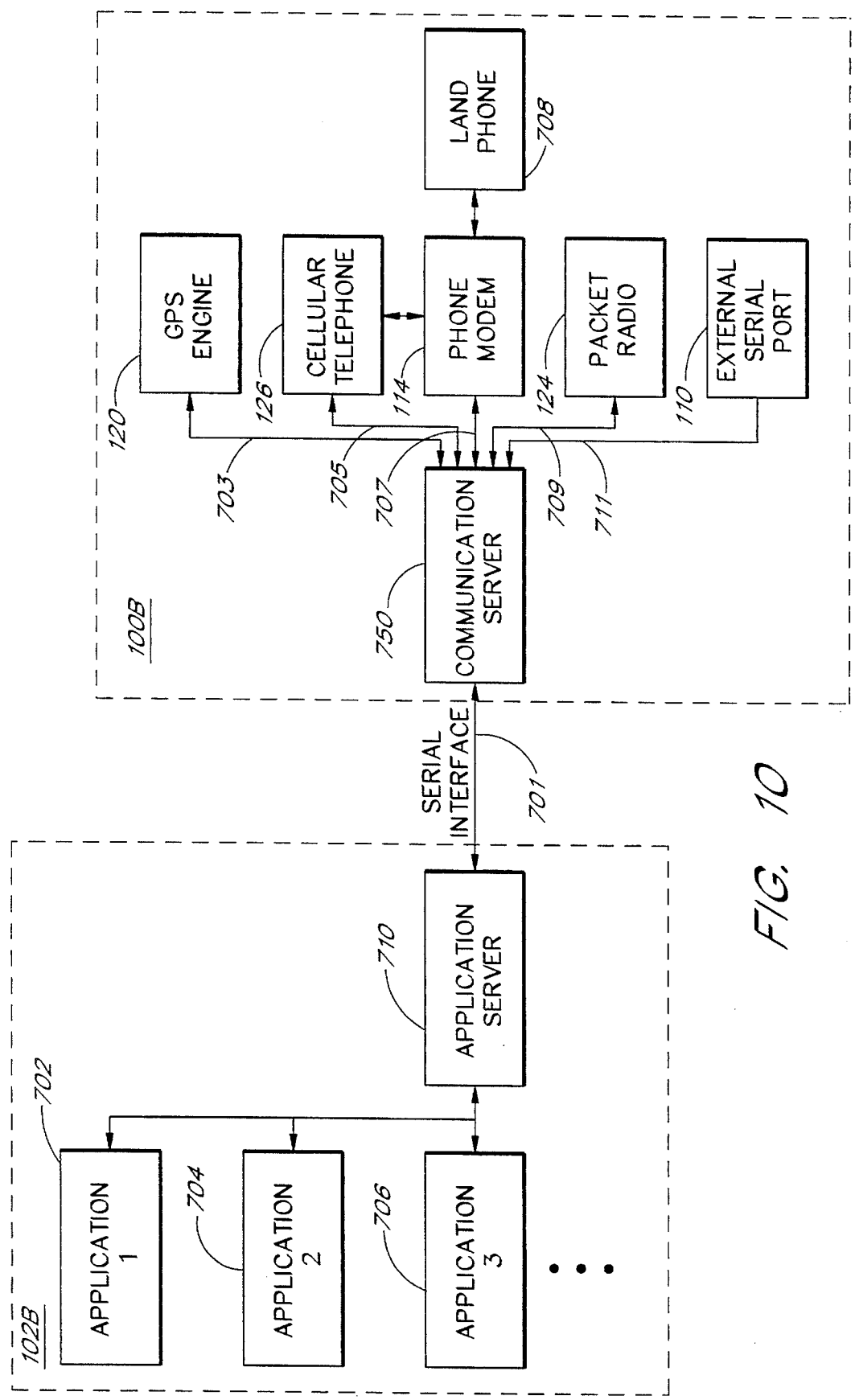
FIG. 10 is a functional block diagram of a second embodiment of the communication device of the present invention connected to a palm computer that has been programmed to implement an improved interface with the communication device.

FIG. 10 illustrates a functional block diagram of the second embodiment communication device 100B connected to a PDA 102B. The PDA 102B is the same as the PDA 102, except that the program executed in the PDA 102B to interface with the communication device 100B is different in some respects from the program executed in the PDA 102 to interface with the communication device 100.

The PDA 102B comprises one or more application programs and an application server 710. FIG. 10 illustrates a first application program 702, a second application program 704 and a third application program 706. Each of the application programs 702, 704, 706 is coupled to the application server 710.

The communication device 100B comprises a communication server 750, the GPS engine 120, the cellular telephone 126, the phone modem 114, a land phone 708, the packet radio 124, and the pass-thru or external serial port 110. The application server 710 of the PDA 102B is coupled to the communication server 750 of the communication device 100B by a serial interface 701. The serial interface 701 between the application server 710 and the communication server 750 corresponds to the serial interface between the PDA 102 and the primary serial port 106 of the first embodiment communication device 100, as illustrated in FIG. 4. The communication server 750 is coupled to the GPS engine 120 by a serial interface 703. The communication server 750 is coupled to the cellular telephone 126 by a serial interface 705. The communication server 750 is coupled to the phone modem 114 by a serial interface 707. The communication server 750 is coupled to the packet radio 124 by a serial interface 709. The communication server 750 is coupled to the external serial port 110 by a serial interface 711. The phone modem 114 is also coupled to the land phone 708 and to the cellular telephone 126.

Generally, the communication circuits 114, 120, 124, 126, as well as the external serial port 110 are utilized for the same purposes as in the first embodiment communication device 100. Each application program 702, 704, 706 can generally utilize any of the functions of the communication circuits 114, 120, 124, 126. For example, the first application 702 may utilize the GPS engine 120 and the packet radio 124, while the second application 704 utilizes the phone modem 114. In the second embodiment communication device 100B, the cellular telephone 126 and the packet radio 124 can be installed simultaneously. Thus, the second embodiment communication device 100B includes both a cellular telephone antenna 121 and a packet radio antenna 122 (See FIG. 4). In fact, all of the communication circuits 114, 120, 124, 126 can be installed simultaneously.

To utilize the communication functions of the communication circuits 114, 120, 124, 126, the applications 702, 704, 706 cause one or more data packets to be generated and communicated to the communication circuits 114, 120, 124, 126. The data packets can contain commands to control the operation of the communication circuits 114, 120, 124, 126, or the data packets can contain requests for data, or the data packets can contain data for transmission by an appropriate communication circuit 114, 120, 124, 126, such as the phone modem 114, the packet radio 124, or a device connected to the external serial port 110. Each data packet also contains an address identifying the destination of the data packet. The destination can be any of the communication circuits 114, 120, 124, 126, or the external serial port 110. The application server 710 generates data packets in response to function calls by the applications 702, 704, 706. The application server 710 then transmits the data packets to the communication server 750. The communication server 750 modifies the data packets before distributing the data packets to the appropriate communication circuits 114, 120, 124, 126, or to the external serial port 110. For example, the application 704 may cause the application server 710 to generate a data packet that requests positional data from the GPS engine 120. The application server 710 transmits the data packet to the communication server 750. The communication server 750 modifies the data packet before forwarding the data packet to the GPS engine 120.

The communication circuits 114, 120, 124, 126 and devices connected to the external serial port 110 also generate data packets for transmission to one or more of the applications 702, 704, 706. Each of the data packets identifies the type of data contained therein. The packet radio 124, for example, may generate a data packet containing data that has been received from a remote source. The communication circuits 114, 120, 124, 126 and the external serial port 110 transmit the data packets to the communication server 750. The communication server 750 modifies the data packets and transmits them to the application server 710, which also modifies the data packets. The application server 710 also determines which applications 702, 704, 706 have requested data of the type contained in a data packet, and sends the data packet to the appropriate applications 702, 704, 706.

As an additional example of the general operation of the PDA 102B and the communication device 100B, suppose that a user of the PDA 102B wants to send data to a remote location using the phone modem 114 and the land phone 708. The user can control one of the application programs 702, 704, 706, such as the first application 702 to control the phone modem 114. The first application 702 first generates one or more data packets to initialize the phone modem 114 and to dial the desired phone number through the land phone 708. Next, the first application 702 sends one or more additional data packets containing the data to be transmitted. The application server 710 transmits each of the data packets to the communication server 750, which modifies the data packets and routes them to the phone modem 114. The phone modem 114 responds to the data packets to establish the requested communication with the remote location using the land phone 708. The phone modem 114 then transmits the supplied data.

Figure 11:
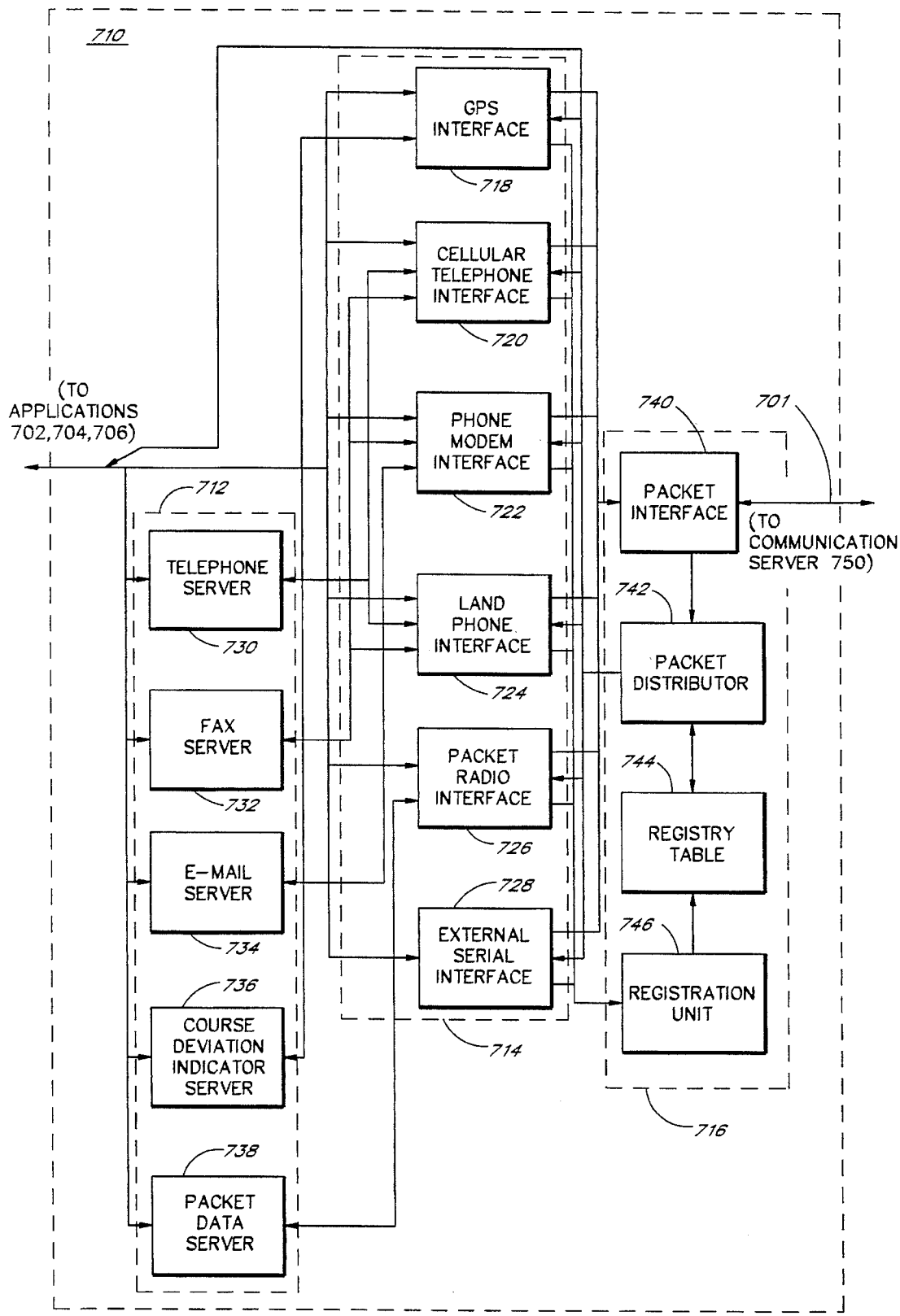
FIG. 11 is a functional block diagram of the application server of FIG. 10.

FIG. 11 is a functional block diagram of the application server 710 of FIG. 10. The application server 710 comprises a set of service routines 712, a set of interface units 714, and an arbitrator 716. The set of service routines 712 comprises a telephone server 730, a fax server 732, an e-mail server 734, a course deviation indicator server 736, and a packet data server 738. The set of interface units 714 comprises a GPS interface 718, a cellular telephone interface 720, a phone modem interface 722, a land phone interface 724, a packet radio interface 726, and an external serial interface 728. The arbitrator 716 comprises an application packet interface 740, an application packet distributor 742, a registry table 744, and a registration unit 746.

Each of the applications 702, 704, 706 is coupled to each of the service routines 730, 732, 734, 736, 738 and to each of the interface units 718, 720, 722, 724, 726, 728. The telephone server 730 is coupled to the cellular telephone interface 720 and the land phone interface 724. The fax server 732 is coupled to the cellular telephone interface 720, the phone modem interface 722, and the land phone interface 724. The e-mail server 734 is coupled to the phone modem interface 722. The course deviation indicator server 736 is coupled to the GPS interface 718. The packet data server 738 is coupled to the packet radio interface 726. Each of the interface units 718, 720, 722, 724, 726, 728 is coupled to the application packet interface 740, the application packet distributor 742, and the registration unit 746. The registration unit 746 is coupled to the registry table 744, which is coupled to the application packet distributor 742. The application packet distributor 742 is coupled to the application packet interface 740, which is coupled to the communication server 750 by the serial interface 701. The application packet distributor 742 is also coupled to each of the applications 702, 704, 706.

Figure 12:
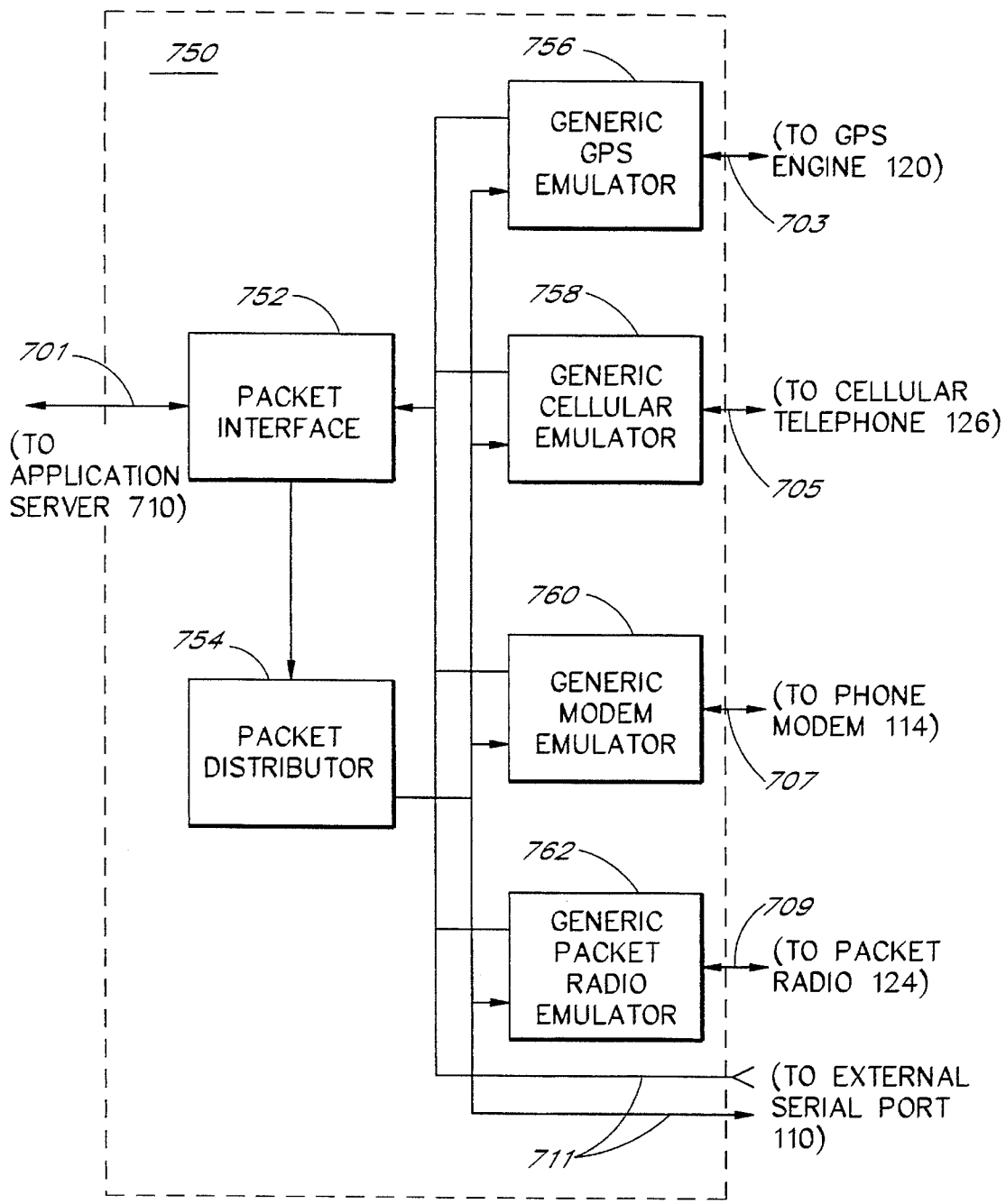
FIG. 12 is a functional block diagram of the software of the communication server of FIG. 10.

FIG. 12 illustrates a software functional block diagram of the communication server 750 of FIG. 10. The communication server 750 comprises a communication packet interface 752, a communication packet distributor 754, a generic GPS emulator 756, a generic cellular emulator 758, a generic modem emulator 760, and a generic packet radio emulator 762. The communication packet interface 752 is coupled to the application server 710, and, more specifically, to the application packet interface 740 by the serial interface 701. The communication packet interface 752 is also coupled to the communication packet distributor 754. The communication packet interface 752 is coupled to the generic GPS emulator 756, the generic cellular emulator 758, the generic modem emulator 760, and the generic packet radio emulator 762. The communication packet distributor 754 is also coupled to the generic GPS emulator 756, the generic cellular emulator 758, the generic modem emulator 760, and the generic packet radio emulator 762. The communication packet interface 752 and the communication packet distributor 754 are also coupled to the external serial port 110 by the serial interface 711. The generic GPS emulator 756 is coupled to the GPS engine 120 by the serial interface 703. The generic cellular emulator 758 is coupled to the cellular telephone 126 by the serial interface 705. The generic modem emulator 760 is coupled to the phone modem 114 by the serial interface 707. The generic packet radio emulator 762 is coupled to the packet radio 124 by the serial interface 709.

Each generic emulator 756, 758, 760, 762 provides a common software interface to the application server 710 regardless of the specific model of communication circuit 114, 120, 124, 126 that implements a given communication function. For example, the generic GPS emulator 756 provides the same software interface to the application server 710 whether the GPS engine 120 is a Rockwell NavCore® VI MicroTracker™ GPS circuit card, or some other GPS circuit card, made by Rockwell or another manufacturer. The application server 710 can send the same format data packets to the generic GPS emulator 756 no matter which model of GPS engine 120 is utilized. The generic GPS emulator 756 determines the model of GPS engine 120 that is attached to the communication device 100B and reformats received data packets to conform to the format required by the attached model. Similarly, the generic cellular emulator 758, the generic modem emulator 760, and the generic packet radio emulator 762 reformat received data packets to conform to the requirements of the specific models of communication circuits 126, 114, 124 that are attached.

The communication packet interface 752 receives data packets from the application packet interface 740 over the serial interface 701 and transfers the data packets to the communication packet distributor 754. The communication packet distributor 754 reads the destination address of the data packets and transfers each of the data packets to the appropriate generic emulator 756, 758, 760, 762, or to the external serial port 110. For example, if the destination address of a data packet identifies the packet radio 124, the communication packet distributor 754 transfers the data packet to the generic packet radio emulator 762. If the destination address identifies a device connected to the external serial port 110, the communication packet distributor 754 transfers the data packet to the external serial port 110. The generic emulators 756, 758, 760, 762 reformat any received data packets before transferring them to the addressed communication circuits 114, 120, 124, 126.

The generic emulators 756, 758, 760, 762 also receive data packets from the corresponding communication circuits 114, 120, 124, 126. The data packets received from the communication circuits 114, 120, 124, 126 are in formats that are specific to the particular models of communication circuits 114, 120, 124, 126 that are attached to the communication device 100B. Each of the generic emulators 756, 758, 760, 762 reformats the received data packets into a generic format. For example, the Rockwell NavCore® VI MicroTracker™ GPS circuit card generates data packets that have a format that may be unique to that particular model of GPS engine 120. The generic GPS emulator 756 reformats data packets received from the Rockwell NavCore® VI MicroTracker™ GPS circuit card into the same pre-defined generic format that is used for other models of the GPS engine 120. Thus, the formats of the data packets generated by the generic emulators 756, 758, 760, 762 are independent of the particular models of communication circuits 114, 120, 124, 126 that are attached to the communication device 100B. The communication packet interface 752 receives data packets from each of the generic emulators 756, 758, 760, 762 and from the external serial port 110 and transmits the data packets to the application packet interface 740 over the serial interface 701.

The interface units 718, 720, 722, 724, 726, 728 generate data packets in response to user control of the applications 702, 704, 706 directly, or through the set of service routines 730, 732, 734, 736, 738. The data packets generated by the interface units 718, 720, 722, 724, 726, 728 conform to the requirements of corresponding generic emulators 756, 758, 760, 762 or to the requirements of devices connected to the external serial port 110. Specifically, the GPS interface 718 generates data packets according to the requirements of the generic GPS emulator 756, the cellular telephone interface 720 generates data packets according to the requirements of the generic cellular emulator 758, the phone modem interface 722 and the land phone interface 724 generate data packets according to the requirements of the generic modem emulator 760, the packet radio interface 726 generates data packets according to the requirements of the generic packet radio emulator 762, and the external serial interface 728 generates data packets according to the requirements of the devices that are connected to the external serial port 110. The data packets that are generated by the interface units 718, 720, 722, 724, 726, 728 are sent to the application packet interface 740, which transmits the data packets to the communication packet interface 752, over the serial interface 701.

The applications 702, 704, 706 can interact directly with the interface units 718, 720, 722, 724, 726, 728 to cause the interface units 718, 720, 722, 724, 726, 728 to generate the desired data packets. For example, the application 704 can call a routine or method within the cellular telephone interface 720 that causes the cellular telephone interface 720 to generate a data packet to cause the cellular telephone 126 to dial a specified telephone number. Alternatively, the applications 702, 704, 706 can utilize the service routines 730, 732, 734, 736, 738 to assist in the control of the communication circuits 114, 120, 124, 126. The service routines 730, 732, 734, 736, 738 implement many of the same functions that are provided directly from the interface units 718, 720, 722, 724, 726, 728. However, the functions of the service routines 730, 732, 734, 736, 738 are arranged in a functional manner for the convenience of the user. For example, a user can select a function to dial a phone number from the telephone server 730, and the telephone server 730 either causes the cellular telephone interface 720 to generate a data packet for the cellular telephone 126, or it causes the land phone interface 724 to generate a data packet for the land telephone 708, depending on which type of telephone has been previously selected for operation.

Also, as described above, the application packet interface 740 receives generic data packets from the communication packet interface 752. The application packet interface 740 provides the received data packets to the application packet distributor 742. As described in greater detail below, with reference to FIGS. 15A to 15C, the application packet distributor 742 requests that the appropriate interface units 718, 720, 722, 724, 726, 728 process the generic data packets to extract data required by the applications 702, 704, 706. The application packet distributor 742 refers to the registry table 744 to determine which applications should receive the data packets after the data packets have been processed by the appropriate interface units 718, 720, 722, 724, 726, 728. The application packet distributor 742 sends the processed data packets directly to the appropriate applications 702, 704, 706.

The telephone server 730 can be used to process incoming and outgoing phone calls using either the cellular telephone interface 720 or the land phone interface 724, depending on which type of telephone interface has been previously selected. The telephone server 730 provides various functions to the applications 702,704,706, such as allowing for the selection of a type of telephone interface for subsequent operations, dialing a telephone number, answering a call, terminating a phone connection, determining the current signal strength, redialing the last dialed number, setting the volume level for an attached earphone, setting a volume level for the ringer of the selected telephone 126, 708, sending tones from the selected telephone 126, 708, determining the air time that has been consumed, determining the battery level of the communication device 100B, determining the current roam state, and determining the current service state.

Similarly, the fax server 732 can be used to send and receive data using the phone modem interface 722 and either the cellular telephone interface 720 or the land phone interface 724. The fax server 732 also provides functions such as allowing for the selection of a type of telephone interface for subsequent operations, powering on or off the phone modem 114, dialing a telephone number, answering a call, sending or receiving a fax, controlling the phone modem 114 to automatically receive a fax, and terminating a phone connection.

The e-mail server 734 can be used to send and receive data using the phone modem interface 722. The e-mail server 734 also provides functions such as powering on or off the phone modem 114, sending or receiving an e-mail, and controlling the phone modem 114 to automatically receive an e-mail.

The course deviation indicator server 736 can be used to determine a user's current location or to obtain directions to a desired location using the GPS interface 718. The course deviation indicator server 736 also provides functions such as determining whether a GPS engine 120 is present, powering on or off the GPS engine 120, determining or setting the current operating state of the GPS engine 120, and requesting periodic position data from the GPS engine 120.

The packet data server 738 can be used to send and receive data using the packet radio interface 726. The packet data server 738 also provides functions such as determining whether a packet radio 124 is attached to the communication device 100B, powering on or off the packet radio 124, causing the packet radio 124 to execute a cold start, determining and setting the operating mode of the packet radio 124, determining the number of packets waiting to be read or transmitted, determining the signal strength, determining status results regarding the data packet link or regarding a specific transmission or reception, setting a channel for transmission or reception, and setting the packet radio 124 to automatically receive data packets.

The GPS interface 718 can be used to control the GPS engine 120 to determine the location of the PDA 102B and the communication device 100B to within 25 meters. The GPS interface 718 provides a number of functions, such as determining whether a GPS engine 120 is present, powering on or off the GPS engine 120, determining the current battery level of the communication device 100B, determining or setting the power management mode of the GPS engine 120, determining or setting the current operating state of the GPS engine 120, requesting periodic position data from the GPS engine 120, requesting satellite information from the GPS engine 120, and initiating a self test in the GPS engine 120.

The cellular telephone interface 720 can be used for incoming and outgoing cellular phone calls. The cellular telephone interface 720 can also be used in conjunction with the phone modem interface 722 to send and receive data over a cellular link. The cellular telephone interface 720 provides functions such as determining whether a cellular telephone 126 is attached to the communication device 100B, dialing a telephone number, answering a call, terminating a phone connection, determining the current signal strength, redialing the last dialed number, setting the volume level for an attached earphone, setting a volume level for the ringer of the cellular telephone 126, sending tones from the cellular telephone 126, determining the air time that has been consumed, determining the battery level of the communication device 100B, determining the current roam state, determining the current service state.

The phone modem interface 722 is used in conjunction with either the cellular telephone interface 720 or the land phone interface 724 to send and receive data. The phone modem interface 722 also provides functions such as allowing for the selection of a type of telephone interface for subsequent operations, determining the battery level of the communication device 100B, powering on or off the phone modem 114, sending data or receiving data, sending a fax or receiving a fax, controlling the phone modem 114 to automatically receive data or a fax, providing a special escape sequence to cause the phone modem 114 to exit an on-line mode and return to a command mode, and generating AT commands to the phone modem 114.

The land phone interface 724 is primarily used in conjunction with the phone modem interface 722 to send and receive data, and for voice calls. The land phone interface 724 also provides functions such as determining whether a land phone 708 is attached to the communication device 100B, dialing a telephone number, answering a call, terminating a phone connection, determining the current signal strength, redialing the last dialed number, setting the volume level for an attached earphone, setting a volume level for the ringer of the land phone 708, sending tones from the land phone 708, determining the air time that has been consumed, and determining the battery level of the communication device 100B.

The packet radio interface 726 provides access to the packet radio 124, and implements functions such as determining whether a packet radio 124 is attached to the communication device 100B, powering on or off the packet radio 124, causing the packet radio 124 to execute a cold start, determining the battery level of the communication device 100B, determining and setting the power management mode of the packet radio 124, determining and setting the operating mode of the packet radio 124, determining the number of packets waiting to be read or transmitted, determining the signal strength, determining status results regarding the data packet link or regarding a specific transmission or reception, setting a channel for transmission or reception, and setting the packet radio 124 to automatically receive data packets.

The external serial interface 728 provides access to devices connected to the external serial port 110, and implements functions such as determining the battery level of the communication device 100B and determining the state of the external serial port 110.

Each of the interface units 718, 720, 722, 724, 726, 728 can also set the corresponding communication circuit 114, 120, 124, 126 or the external serial port 110 into a native mode that allows the communication circuits 114, 120, 124, 126 and the external serial port 110 to receive and execute commands that are similar to those that are described above with reference to the first embodiment communication device 100.

Figure 13:
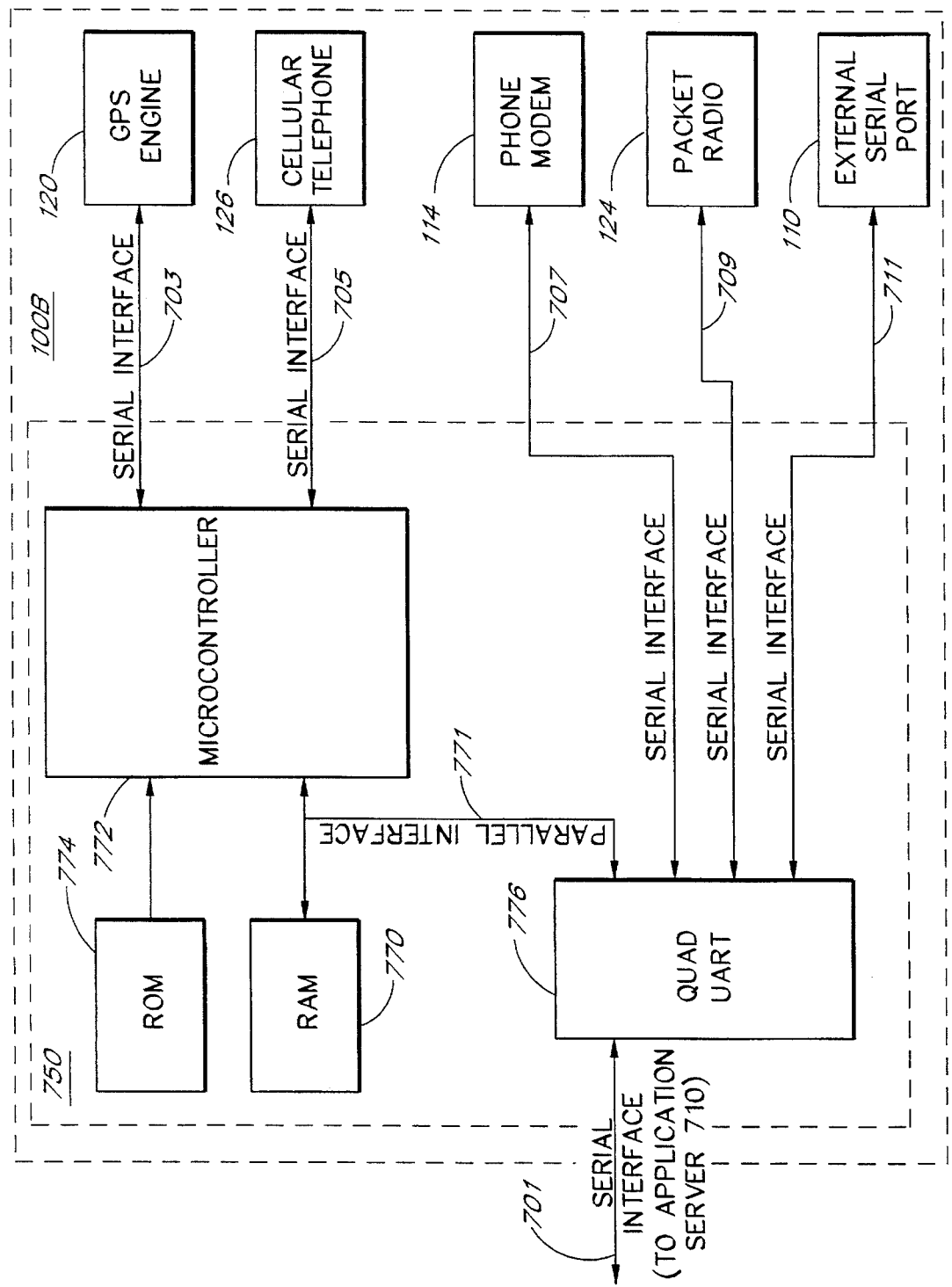
FIG. 13 is a functional block diagram of the hardware of the communication server of FIG. 10.

FIG. 13 illustrates a hardware functional block diagram of the communication server 750 of FIG. 10, along with the GPS engine 120, the cellular telephone 126, the phone modem 114, the packet radio 124, and the external serial port 110. The communication server 750 comprises a RAM 770, a microcontroller 772, a ROM 774, and a quad universal asynchronous receiver transmitter (quad UART) 776. The quad UART 776 is coupled to the application packet interface 740 by the serial interface 701. The quad UART 776 is connected to both the microcontroller 772 and the RAM 770 by a parallel interface 771. The quad UART 776 is connected to the phone modem 114 by the serial interface 707. The quad UART 776 is connected to the packet radio 124 by the serial interface 709. The quad UART 776 is connected to the external serial port 110 by the serial interface 711. The microcontroller 772 is connected to the ROM 774. The microcontroller 772 is connected to the GPS engine 120 by the serial interface 703. The microcontroller 772 is connected to the cellular telephone 126 by the serial interface 705.

The microcontroller 772 preferably comprises an Intel® 80C320 microcontroller. The quad UART 776 preferably comprises a Startech ST16C454 quad UART. The RAM 770 preferably comprises a Fujitsu MB84256A 32Kx8 static RAM, or a similar device. The ROM 774 preferably comprises a Texas Instruments 29F010 128Kx8 flash memory, or a similar device.

The communication packet interface 752, the communication packet distributor 754, and the generic emulators 756, 758, 760, 762 are implemented in software inside the ROM 774 that is executed by the microcontroller 772. The quad UART 776 effectively provides the microcontroller 772 with four additional serial ports. The microcontroller 772 receives data packets directly from the GPS engine 120 and the cellular telephone 126 via the serial interfaces 703, 705. Generally, the slower communication circuits 114, 120, 124, 126 are connected directly to the microcontroller 772. When the GPS engine 120 or the cellular telephone 126 transmits a data packet to the microcontroller 772, the transmitting communication circuit 120, 126 generates a vectored interrupt to the microcontroller 772. In response to the vectored interrupt, the microcontroller 772 receives the incoming data packet and stores the data in the RAM 770. The microcontroller 772 processes the stored data packet and transfers the data packet to the quad UART 776 over the parallel interface 771 for transmission to the application packet interface 740 over the serial interface 701.

The quad UART 776 receives data packets from the application packet interface 740 over the serial interface 701, from the phone modem 114 over the serial interface 707, from the packet radio 124 over the serial interface 709, and from the external serial port 110 over the serial interface 711. The quad UART 776 receives a single interrupt signal in connection with the receipt of any of the received data packets. The quad UART 776 polls the serial ports to determine which port has received a data packet. The quad UART 776 receives the data packet and transfers the data packet to the microcontroller 772. The quad UART 776 interrupts the microcontroller 772 with a vectored interrupt indicative of the serial port that received the data packet. Thus, if the quad UART 776 receives a data packet from the packet radio 124 over the serial interface 709, the quad UART 776 interrupts the microcontroller 772 using a vector that indicates to the microcontroller 772 that the data packet was received from the packet radio 124. The microcontroller 772 processes data packets received from the phone modem 114, the packet radio 124 and the external serial port 110 before returning the data packets to the quad UART 776 for transmission to the application packet interface 740 over the serial interface 701.

The microcontroller 772 also processes data packets that have been received by the quad UART 776 over the serial interface 701. After processing such a data packet, if the data packet is addressed to the GPS engine 120, the microcontroller 772 transmits the data packet directly to the GPS engine 120 over the serial interface 703. If the data packet is addressed to the cellular telephone 126, the microcontroller 772 transmits the data packet directly to the cellular telephone 126 over the serial interface 705. If the data packet is addressed to the phone modem 114, the microcontroller 772 transfers the data packet to the quad UART 776 over the parallel interface 771, which subsequently transmits the data packet to the phone modem 114 over the serial interface 707. If the data packet is addressed to the packet radio 124, the microcontroller 772 transfers the data packet to the quad UART 776 over the parallel interface 771, which subsequently transmits the data packet to the packet radio 124 over the serial interface 709. If the data packet is addressed to the external serial port 110, the microcontroller 772 transfers the data packet to the quad UART 776 over the parallel interface 771, which subsequently transmits the data packet to the external serial port 110 over the serial interface 711. Data packets can also be addressed to the microcontroller 772 to control different aspects of the operation of the microcontroller 772. For example, a data packet can be sent to the microcontroller 772 to control the selection of an interconnection between the cellular telephone 126, the phone modem 114, the microphone and earphone jack 132, and the land phone 708, as described in greater detail below with reference to FIG. 14.

Figure 14:
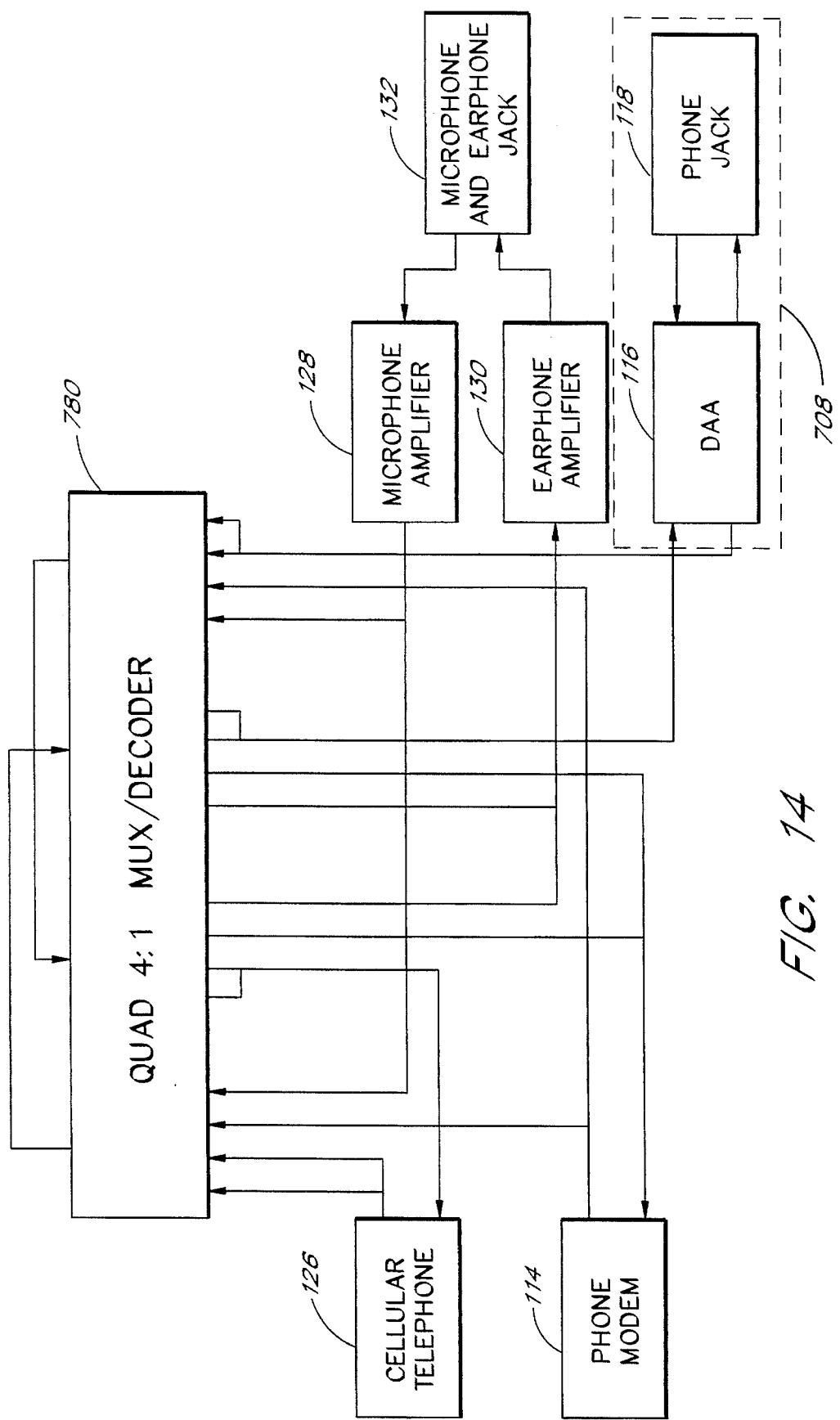
FIG. 14 is a functional block diagram of the interconnections between the cellular telephone, the phone modem, the microphone and earphone jack and the phone jack of the second embodiment.

FIG. 14 illustrates a functional block diagram of the interface between the cellular telephone 126, the phone modem 114, the microphone and earphone jack 132, and the land phone 708. The land phone 708 comprises the DAA 116 and the phone jack 118. FIG. 14 also illustrates a quad 4-to-1 multiplexer/decoder 780, the microphone amplifier 128, and the earphone amplifier 130. In the second embodiment, the functionality of the quad 4-to-1 multiplexer/decoder 780 is implemented with a 74HC4053 multiplexer and a number of 74HC4066 electronic switches.

An output of the cellular telephone 126 is connected to a first input and a second input of a first 4:1 multiplexer of the multiplexer/decoder 780. An output of the phone modem 114 is connected to a third input of the first multiplexer of the multiplexer/decoder 780. An output of the microphone amplifier 128 is connected to a fourth input of the first multiplexer of the multiplexer/decoder 780. An output of the first multiplexer of the multiplexer/decoder 780 is connected to an input of a first 1:4 decoder of the multiplexer/decoder 780. A first output of the first decoder of the multiplexer/decoder 780 is connected to an input of the earphone amplifier 130. A second output of the first decoder of the multiplexer/decoder 780 is connected to an input of the phone modem 114. A third output and a fourth output of the first decoder of the multiplexer/decoder 780 are connected to an input of the DAA 116.

The output of the microphone amplifier 128 is connected to a first input of a second 4:1 multiplexer of the multiplexer/decoder 780. The output of the phone modem 114 is connected to a second input of the second multiplexer of the multiplexer/decoder 780. An output of the DAA 116 is connected to a third input and a fourth input of the second multiplexer of the multiplexer/decoder 780. An output of the second multiplexer of the multiplexer/decoder 780 is connected to an input of a second 1:4 decoder of the multiplexer/decoder 780. A first output and a second output of the second decoder of the multiplexer/decoder 780 are connected to an input of the cellular telephone 126. A third output of the second decoder of the multiplexer/decoder 780 is connected to the input of the phone modem 114. A fourth output of the second decoder of the multiplexer/decoder 780 is connected to the input of the earphone amplifier 130.

As in the first embodiment of the present invention, an output of the earphone amplifier 130 is connected to an input of the microphone and earphone jack 132, an output of the microphone and earphone jack 132 is connected to an input of the microphone amplifier 128, an output of the DAA 116 is connected to an input of the phone jack 118, and an output of the phone jack 118 is connected to an input of the DAA 116.

In functional terms, the microcontroller 772 controls the operation of the multiplexer/decoder 780 by the use of two select lines. The same two select lines are connected to each of the multiplexers and each of the decoders of the multiplexer/decoder 780 in the same manner, so that corresponding inputs of the multiplexers and outputs of the decoders are always selected simultaneously. For example, if the second input of the first multiplexer is selected, the second input of the second multiplexer, the second output of the first decoder and the second output of the second decoder are also selected.

If the microcontroller 772 selects the first inputs and outputs of the multiplexer/decoder 780, the cellular telephone 126 is coupled to the microphone and earphone jack 132. In this mode, a user can use an attached microphone and earphone to communicate to a remote party using a cellular system.

If the microcontroller 772 selects the second inputs and outputs of the multiplexer/decoder 780, the cellular telephone 126 is coupled to the phone modem 114. In this mode, data can be sent from the PDA 102B to a remote destination or received at the PDA 102B from a remote source, through the phone modem 114, again using a cellular system. To use the communication device 100B in this mode, the microcontroller 772 must first control the cellular telephone 126 directly to dial the desired number and establish the cellular link. After the link is established, the microcontroller 772 can send data through the phone modem 114 to the cellular telephone 126 to be transmitted over the cellular link to a remote location, or data can be transmitted from a remote location to the cellular telephone 126, which sends the data through the phone modem 114 to the microcontroller 772. In this latter event, the phone modem 114 generates a data packet to be transmitted to the application packet interface 740.

If the microcontroller 772 selects the third inputs and outputs of the multiplexer/decoder 780, the phone modem 114 is coupled to the land phone 708. In this mode, data can be sent from the PDA 102B to a remote destination or received at the PDA 102B from a remote source, through the phone modem 114, using a land-based telephone line.

If the microcontroller 772 selects the fourth inputs and outputs of the multiplexer/decoder 780, the microphone and earphone jack 132 is coupled to the land phone 708. In this mode, a user can use an attached microphone and earphone to communicate to a remote party using a land-based telephone line.

In this second embodiment, only one of the four above-described connections can be established at a time. However, a person of skill in the art will understand that an alternative interconnection could be used that would allow multiple connections to be established simultaneously. For example, an alternative embodiment can allow data to be transferred over a cellular system using the phone modem 114 and the cellular telephone 126, while a user talks over a land-based telephone line using an attached microphone and earphone and the land phone 708.

Figure 15A:
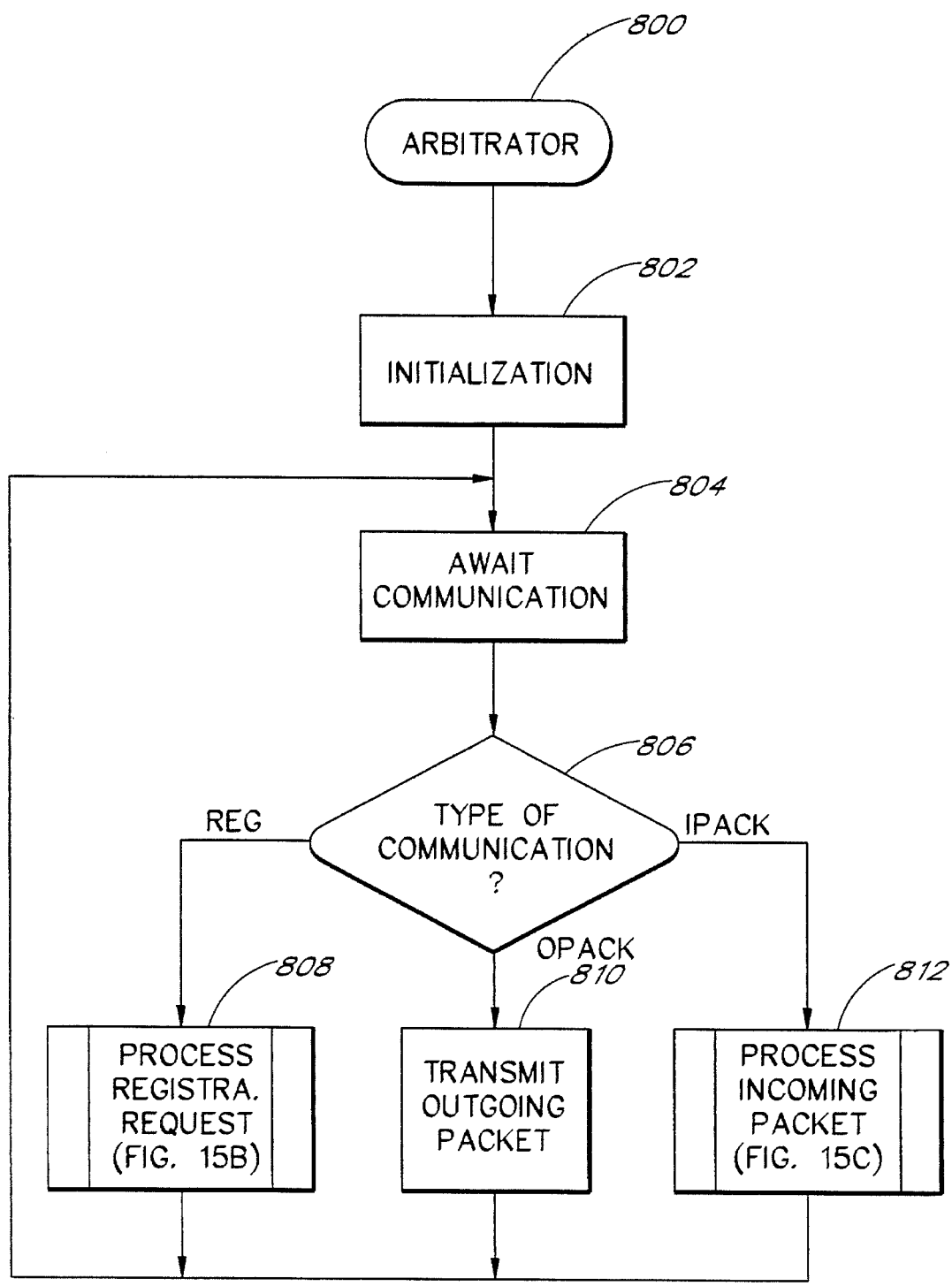
FIGS. 15A, 15B, and 15C illustrate a flow chart of the method implemented by the arbitrator of FIG. 11.
Figure 15B:
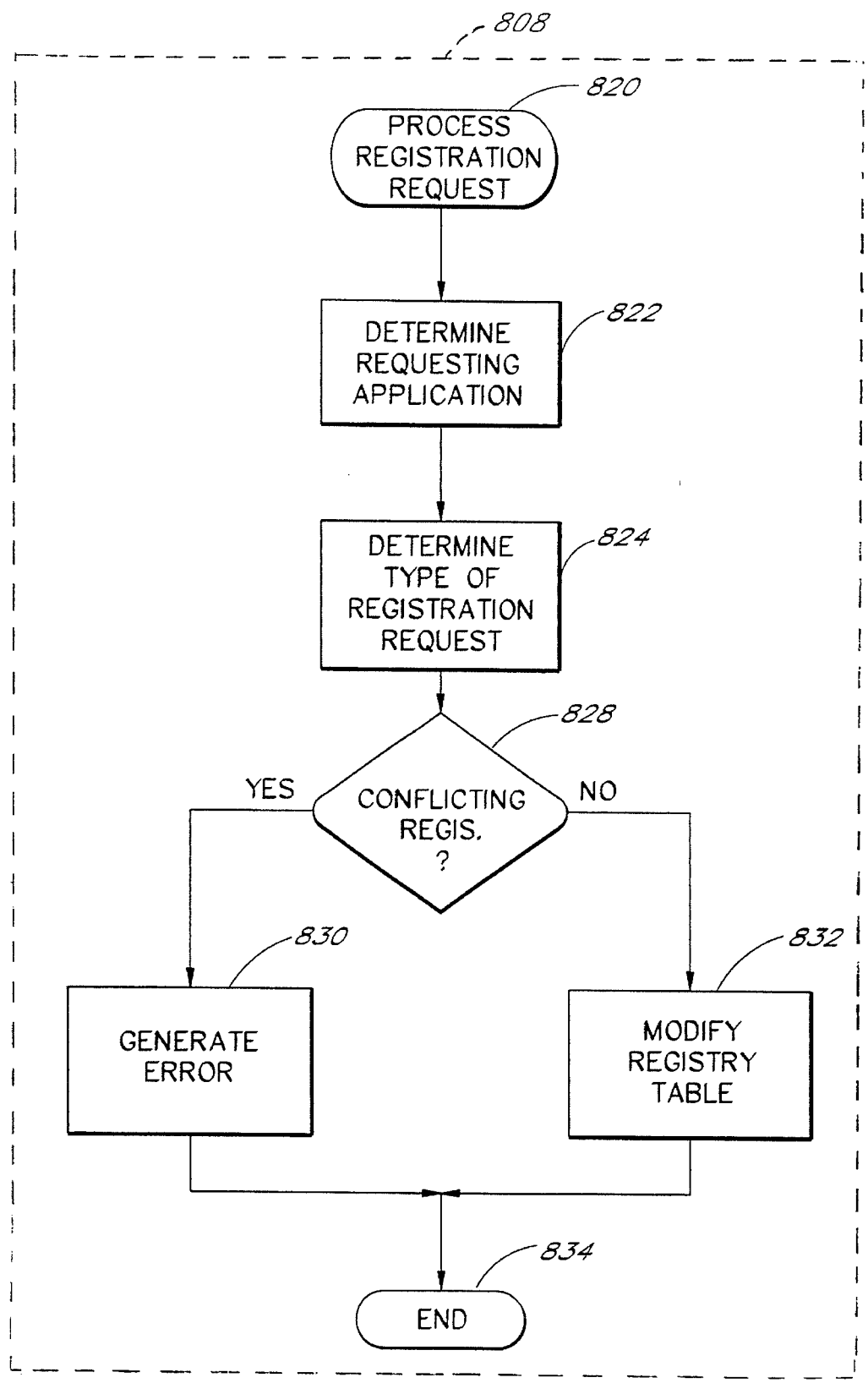
Figure 15C:
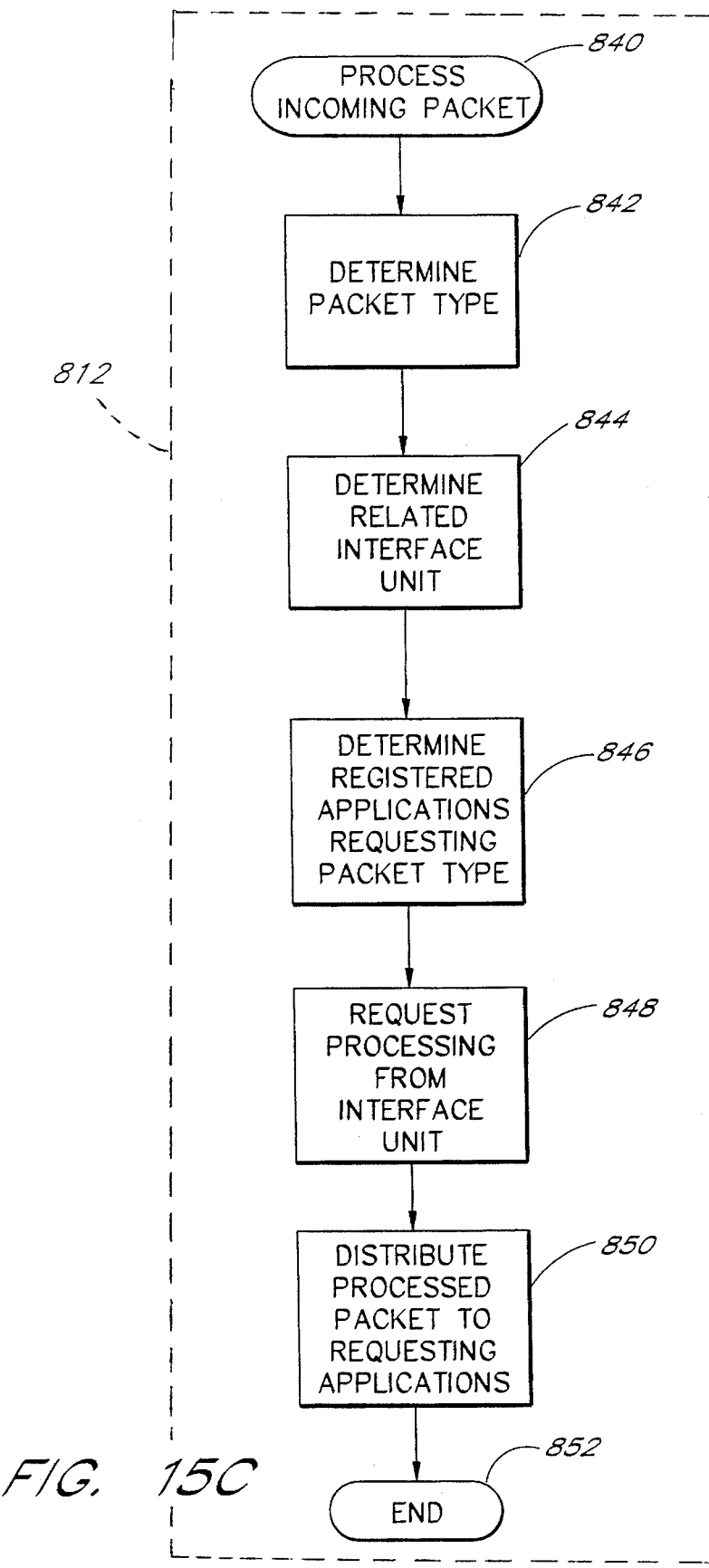

FIGS. 15A, 15B, and 15C illustrate a method performed by the arbitrator 716 during operation of the PDA 102B and the communication device 100B. The method begins at an initial block 800 of FIG. 15A.

At a process block 802, the arbitrator 716 initializes the application server 710 and the serial interface 701. The serial interface 701 is initialized by transmitting an initialization data packet to the communication server 750. The communication server 750 receives the initialization data packet and transmits a response data packet back to the arbitrator 716 to verify initialization of the serial interface 701. Either the arbitrator 716 or the communication server 750 can also initialize the serial interface 701 at other times, as required, by a similar process. If the communication server 750 initializes the serial interface 701, the communication server 750 transmits the initialization data packet, and the arbitrator 716 transmits the response data packet.

At a process block 804, the arbitrator 716 awaits communication from other functional units. The arbitrator 716 may receive a request for registration from an application 702, 704,706 through one of the interface units 718, 720, 722,724, 726, 728. A request for registration is received by the registration unit 746. Alternatively, the arbitrator 716 may receive an outgoing data packet (opack) from an application 702, 704, 706, again through one of the interface units 718, 720, 722, 724, 726, 728. An outgoing data packet is received by the application packet interface 740. Alternatively, the arbitrator 716 may receive an incoming data packet (ipack) from the communication server 750 over the serial interface 701. An incoming data packet is also received by the application packet interface 740.

At a decision block 806, the arbitrator 716 determines which type of communication has been received. If a registration request has been received, the arbitrator 716 advances to a process block 808. If an outgoing data packet has been received, the arbitrator 716 advances to a process block 810. If an incoming data packet has been received, the arbitrator 716 advances to a process block 812.

At the process block 808, the arbitrator 716 processes the registration request. The method for processing a registration request is described in greater detail below with reference to FIG. 15B. After the process block 808, the arbitrator 716 advances to the process block 804 to await further communication.

At the process block 810, the arbitrator 716 transmits the outgoing data packet to the communication server 750 over the serial interface 701. After the process block 810, the arbitrator 716 also advances to the process block 804.

At the process block 812, the arbitrator 716 processes the incoming data packet. The method for processing an incoming data packet is described in greater detail below with reference to FIG. 15C. After the process block 812, the arbitrator 716 also advances to the process block 804.

FIG. 15B illustrates the method performed by the registration unit 746 at the process block 808 of FIG. 15A to process a registration request. The method of FIG. 15B begins at an initial block 820.

At a process block 822, the registration unit 746 determines which application 702, 704, 706 requested the registration. This information is provided by the requesting application 702, 704, 706 in the registration request.

At a process block 824, the registration unit 746 determines the type of registration request that has been received. The registration request can specify a request to either establish or cancel a registration. The registration request also identifies a particular type of data packet. For example, a requesting application 702, 704, 706 may request to receive a data packet generated by the GPS engine 120 containing positional data related to the PDA 102B. The requesting application 702,704,706 can also request either a one-shot registration or a continuous registration. A one-shot registration is canceled after a first data packet is received by the arbitrator 716 that matches the type of data packet requested by the requesting application 702,704,706. If the registration unit 746 registers a continuous registration request, the requesting application 702, 704, 706 continues to receive incoming data packets that match the requested type until the registration is canceled.

At a decision block 828, the registration unit 746 checks for a conflict between the current registration request and the registered requests in the registry table 744. A conflict may occur, for example, if there is no registered request in the registry table 744 that matches a current request to cancel a registration. A conflict may also occur if a request to establish a registration matches a previously registered request, or under other circumstances. If the registration unit 746 detects a conflict, the method advances to a process block 830. Otherwise, the method advances to a process block 832.

At the process block 830, the registration unit 746 generates an error indication and advances to a terminal block 834.

At the process block 832, the registration unit 746 modifies the registry table 744 according to the registration request. If the request seeks to cancel a registered request, the registration unit 746 deletes the entry in the registry table 744 that corresponds to the current request. If the request seeks to register a new request, the registration unit 746 generates a new entry in the registry table 744 identifying the type of registration requested. After the process block 832, the registration unit 746 advances to the terminal block 834, at which the method ends.

FIG. 15C illustrates the method performed by the application packet distributor 742 at the process block 812 of FIG. 15A to process an incoming data packet. The method of FIG. 15C begins at an initial block 840. Incoming data packets are received by the application packet interface 740, which stores the received data packets in the memory of the PDA 102B. The application packet interface 740 then notifies the application packet distributor 742 of the location of the data packets in memory.

At a process block 842, the application packet distributor 742 determines the type of data packet that has been received. A data packet can contain specific data that has been requested by an application 702, 704, 706, it can contain incoming data from one of the communication circuits 114, 120, 124, 126 or from the external serial port 110, or it can contain information reflecting changes in the communication device 100B.

At a process block 844, the application packet distributor 742 determines which interface unit 718, 720, 722, 724, 726, 728 is related to the incoming data packet. For example, if the data packet contains positional data from the GPS engine 120, the related interface unit 718, 720,722, 724, 726, 728 is the GPS interface 718.

At a process block 846, the application packet distributor 742 searches the registry table 744 to determine which applications 702,704,706 have registered requests for the type of data packet that has been received. The application packet distributor 742 also deletes entries in the registry table 744 that identify one-shot requests that correspond to the type of data packet that has been received.

At a process block 848, the application packet distributor 742 requests that the related interface unit 718, 720, 722,

724, 726, 728 process the incoming data packet, as required, to extract the data that is desired by each of the applications 702, 704, 706 that have registered requests for the type of data that has been received. After the related interface unit 718,720, 722,724,726,728 has processed and repackaged the data packet, the method advances to a process block 850.

At the process block 850, the application packet distributor 742 distributes the processed data packet to each of the applications 702, 704, 706 that has registered a request for the type of data that has been received.

After the process block 850, the application packet distributor 742 advances to the terminal block 852, at which the method ends.

As an example of the operation of the second embodiment communication device 100B in conjunction with the PDA 102B, suppose that a user wants to send a document that is stored in the PDA 102B to a remote destination via facsimile, over a land-based telephone line. Assume that the user executes the application program 702 to facilitate sending the fax. The application 702 allows the user to enter the phone number to which the fax should be sent, and it allows the operator to identify the file to be transmitted. The application 702 may also allow the user to set other parameters of the facsimile transmission.

Generally, the application 702 calls one or more functions in the fax server 732 to establish the telephone link with the remote destination. The fax server 732 may call one or more functions in the phone modem interface 722 and the land phone interface 724 to generate one or more data packets for transmission to the phone modem 114. For example, the application 702 may call a function in the fax server 732 to dial the user-specified phone number. The fax server 732 calls a corresponding function in the land phone interface 724. The land phone interface 724 generates a data packet that instructs the phone modem 114 to dial the user-specified phone number. The data packet generated by the land phone interface 724 is directed to a generic phone modem 114, so that it may not be compatible with the phone modem 114 that is actually installed in the communication device 100B. The generic modem emulator 760 modifies the generic modem data packet to conform to the requirements of the phone modem 114 that is actually installed in the communication device 100B. The generic modem emulator 760 then transmits the modified data packet to the phone modem 114, which dials the user-specified phone number.

Next, the application 702 calls one or more functions in the fax server 732 to send the file to the remote destination. The fax server 732 calls one or more functions in the phone modem interface 722 and the land phone interface 724 to generate one or more data packets containing the data in the file. The generic modem emulator 760 again modifies the data packets, and transmits them to the phone modem 114. The phone modem 114 transmits the file to the remote destination.

Next, the application 702 calls one or more functions in the fax server 732 to terminate the connection with the remote destination. Again, the fax server 732 calls one or more functions in the phone modem interface 722 and the land phone interface 724 to generate one or more data packets to terminate the connection. The generic modem emulator 760 again modifies the data packets, and transmits them to the phone modem 114. The phone modem 114 proceeds to terminate the connection with the remote destination, and the process of transmitting the selected file via facsimile is completed.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

I claim:

1. A portable communication system comprising:
    a palm computer comprising at least one application program and an application server, wherein said application server is coupled in communication with said application program and generates data packets in response to requests issued by said at least one application program; and
    a cradle for releasable retaining said palm computer therein, said cradle comprising:
        a communication server coupled to said application server via an interface, said communication server having a packet interface which receives data packets transferred by said application server, said communication server further having a packet distributor coupled to said packet interface which receives data packets from said packet interface, and a plurality of generic emulators coupled to said packet distributor, wherein said packet distributor transfers said data packets received from said packet interface to an appropriate one of said generic emulators; and
        a plurality of integral communications devices, each of said integral communication devices coupled to a corresponding one of said plurality of generic emulators, wherein said generic emulators reformat said data packets received from said packet distributor in accordance with specific requirements of said communication device coupled thereto, and wherein said generic emulators transfer said reformatted data packets to said corresponding communication device.

2. The portable communications system of claim 1, wherein said data packets contain commands to control the operation of said communication devices.

3. The portable communications system of claim 1, wherein said data packets contain requests for data from said communication devices.

4. The portable communications system of claim 1, wherein said data packets contain data for transmission by an appropriate communication device.

5. The portable communications system of claim 1, wherein said data packets contain address information identifying a destination of said data packets.

6. The portable communications system of claim 1, wherein said communication devices further generate data packets for transmission to one or more of said application programs.

7. The portable communications system of claim 6, wherein said data packets generated by said communication devices identify the type of data contained therein.

8. A palm computer communications cradle which provides alternative communication capabilities for a palm computer releasably retained therein, said communications cradle comprising:
    a communication server coupled to said palm computer via an interface, wherein said communication server receives data packets generated by said palm computer; and
    a plurality of integral communications circuits, each of said integral communication circuits coupled to said communication server, wherein said communication server reformats said data packets received from said palm computer in accordance with specific requirements of said communication circuits coupled thereto, and wherein said communication server transfers said reformatted data packets to an appropriate one of said communication circuits.

9. The palm computer communications cradle of claim 8, wherein said communications circuits further generate data packets for transmission to said palm computer.

10. The palm computer communications cradle of claim 8, wherein said communications circuits comprise at least two of a global positioning satellite system, a modem, a packet radio system, a land phone coupled to said modem, and a cellular phone coupled to said modem.

11. The portable communications system of claim 8, wherein said data packets contain commands to control the operation of said communication devices.

12. The portable communications system of claim 8, wherein said data packets contain request for data from said communication devices.

13. The portable communications system of claim 9, wherein said data packets contain data for transmission by an appropriate communication device.

* * * * *